(12) United States Patent
Anderson et al.

(10) Patent No.: US 7,172,991 B2
(45) Date of Patent: *Feb. 6, 2007

(54) INTEGRATED CD/DVD RECORDING AND LABELING

(75) Inventors: Daryl E. Anderson, Corvallis, OR (US); Makarand P Gore, Corvallis, OR (US); Paul J McClellan, Bend, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 992 days.

This patent is subject to a terminal disclaimer.

(21) Appl. No.: 09/976,877

(22) Filed: Oct. 11, 2001

(65) Prior Publication Data

US 2003/0108708 A1    Jun. 12, 2003

(51) Int. Cl.
*B41M 5/20* (2006.01)

(52) U.S. Cl. ............... 503/206; 427/146; 428/64.4; 503/218; 220/221

(58) Field of Classification Search ............... 428/64.4; 427/146; 503/206, 218, 220, 221
See application file for complete search history.

(56) References Cited

U.S. PATENT DOCUMENTS

| 4,394,407 | A | 7/1983 | Blazso ............... 427/150 |
| 4,505,498 | A | 3/1985 | Weinberger ............ 282/91 |
| 4,967,286 | A | 10/1990 | Nomula et al. |
| 5,286,703 | A | 2/1994 | Wachi et al. |
| 5,317,337 | A | 5/1994 | Ewaldt ............... 346/1.1 |
| 5,518,325 | A | 5/1996 | Kahle ............... 400/70 |
| 5,554,196 | A | 9/1996 | Wielstra ............... 8/444 |
| 5,652,195 | A | 7/1997 | Horsten et al. ............ 503/226 |
| 5,741,592 | A | 4/1998 | Lewis et al. ............ 428/402.24 |
| 5,774,160 | A | 6/1998 | Gundjian ............ 347/171 |
| 5,781,221 | A | 7/1998 | Wen et al. ............ 347/232 |
| 5,783,353 | A | 7/1998 | Camillus et al. ............ 430/138 |
| 5,854,175 | A | 12/1998 | DeBoer et al. ............ 503/227 |
| 5,858,583 | A | 1/1999 | Dessauer et al. ............ 430/17 |
| 5,915,858 | A | 6/1999 | Wen ............ 400/61 |
| 5,916,727 | A | 6/1999 | Camillus et al. ............ 430/138 |
| 5,955,224 | A | 9/1999 | Caspar et al. ............ 430/17 |
| 5,989,772 | A | 11/1999 | Tutt et al. |
| 6,019,151 | A | 2/2000 | Wen et al. |
| 6,020,977 | A | 2/2000 | Kim |
| 6,022,648 | A | 2/2000 | Jacobson et al. ............ 430/19 |
| 6,074,031 | A | 6/2000 | Kahle ............ 347/4 |

(Continued)

FOREIGN PATENT DOCUMENTS

EP        1081695 A2    0/2001

(Continued)

OTHER PUBLICATIONS

Hugh Bennett, "CD-E: Call it erasable, call it rewritable, but will it fly?", CD-Rom Professional, Spet 1996, vol. 9(9), pp 29-44.

(Continued)

*Primary Examiner*—Bruce H. Hess

(57) ABSTRACT

An integrated system for individually labeling a recording medium at the time that digital information is recorded thereon, by recording write data with a digital recorder on the read/write surface of the CD/DVD and recording image data by inducing visible color change with a laser in laser sensitive materials on the opposite surface of the CD/DVD.

84 Claims, 3 Drawing Sheets

U.S. PATENT DOCUMENTS

| | | | |
|---|---|---|---|
| 6,127,084 A | 10/2000 | Katampe et al. | 430/138 |
| 6,174,642 B1 | 1/2001 | Polykarpov et al. | 430/138 |
| 6,251,571 B1 | 6/2001 | Dessauer et al. | 430/343 |
| 6,258,505 B1 | 7/2001 | Bhatt et al. | 430/157 |
| 6,264,295 B1 | 7/2001 | Bradshaw et al. | |
| 2001/0026531 A1 | 10/2001 | Onodera et al. | |
| 2002/0122378 A1 | 9/2002 | Kubo | |
| 2002/0191517 A1 | 12/2002 | Honda et al. | |

FOREIGN PATENT DOCUMENTS

| | | |
|---|---|---|
| EP | 0557138 A2 | 8/1993 |
| EP | 0709225 B1 | 8/1998 |
| EP | 0628424 | 11/1998 |
| EP | 0934824 A1 | 8/1999 |
| EP | 0980026 A1 | 2/2000 |
| EP | 1 081 695 A2 | 3/2001 |
| EP | 1084860 A2 | 3/2001 |
| JP | 9123606 | 0/1997 |
| JP | 9123607 | 0/1997 |
| JP | 9265760 | 0/1997 |
| JP | 9306144 | 0/1997 |
| JP | 10320963 | 0/1998 |
| JP | 11003543 | 0/1999 |
| JP | 11086505 | 0/1999 |
| JP | 2000155989 | 0/2000 |
| JP | 2000173096 | 0/2000 |
| JP | 2000173238 | 0/2000 |
| JP | 2000330359 | 0/2000 |
| JP | 2002203321 | 0/2002 |
| JP | 97029158 | 2/1997 |
| JP | 2002203321 | 7/2002 |
| WO | WO99/30481 | 0/1999 |
| WO | WO99/54141 | 0/1999 |
| WO | WO 92/04192 | 3/1992 |
| WO | WO 95/34845 | 12/1995 |
| WO | WO 99/44099 | 9/1999 |
| WO | WO99/45434 | 9/1999 |
| WO | WO 00/25179 | 5/2000 |
| WO | WO 00/72901 | 11/2000 |
| WO | WO 01/43123 | 6/2001 |

OTHER PUBLICATIONS

"Cromogenic Materials" from 'Kirk-Othmer-Encyclopedia of Chemical Technology Fourth Edition' vol. 6, Executive Editor Jacqueline I. Kroschwitz, Editor Mary Howe-Grant; A Wiley-Interscience Publications; pp. 312-343.

'New Ink Promises to Boost Recycling, Save Forests, Decolorable Ink Facilitates Paper Recycling' printed from the web http://www2toshiba.co.jp/magazine/tomorrow/html_e/ink/no1.htm printed Aug. 31, 2001.

INTEGRATED CD/DVD RECORDING AND LABELING

BACKGROUND OF THE INVENTION

Labeling of Compact Disk/Digital Video Disk (CD/DVD) has in the past been routinely accomplished through screen printing methods. While this method can provide a wide variety of label content, it tends to be cost ineffective for run lengths less than 300–400 disks because the fixed cost of unique materials and set-up are shared by all the disks in each run. In screen printing a stencil of the image is prepared, placed in contact with the CD/DVD and then ink is spread by squeegee across the stencil surface. Where there are openings in the stencil the ink passes through to the surface of the CD/DVD, thus producing the image. Preparation of the stencil is an elaborate, time consuming and expensive process.

In recent years, significant increases in use of CD/DVD disks as a data distribution vehicle have increased the need to provide customized label content to reflect the data content of the CD/DVD. For these applications, the screen label printing presents a dilemma as disks are designed to permit customized user information to be recorded in standardized CD/DVD formats.

SUMMARY OF THE INVENTION

In one embodiment, the present invention relates to a system for individually labeling a recording medium as well as individually recording digital information thereon, the system comprising:

a write data source;

an image data source; and a laser device interfacing with the write data source and the image data source, the laser device comprising one or more laser emitters, the one or more laser emitters used to: a) record image data on the recording medium by inducing visible color change in laser sensitive materials on the medium surface; and b) record write data on the recording medium.

In yet another embodiment, the present invention relates to a method for recording in a digital recorder both write data and image data on a recording medium, the method comprising:

placing the recording medium in a digital recorder;

transferring write data from a write data source to the digital recorder;

recording the transferred write data onto the medium with a digital recording device;

transferring image data from an image data source to the digital recorder; and recording the transferred image data onto the medium by inducing visible color change in laser sensitive materials on the medium with a laser beam while the medium is within the recorder.

DETAILED DESCRIPTION OF THE PREFERRED EMBODIMENT

Figure 1:
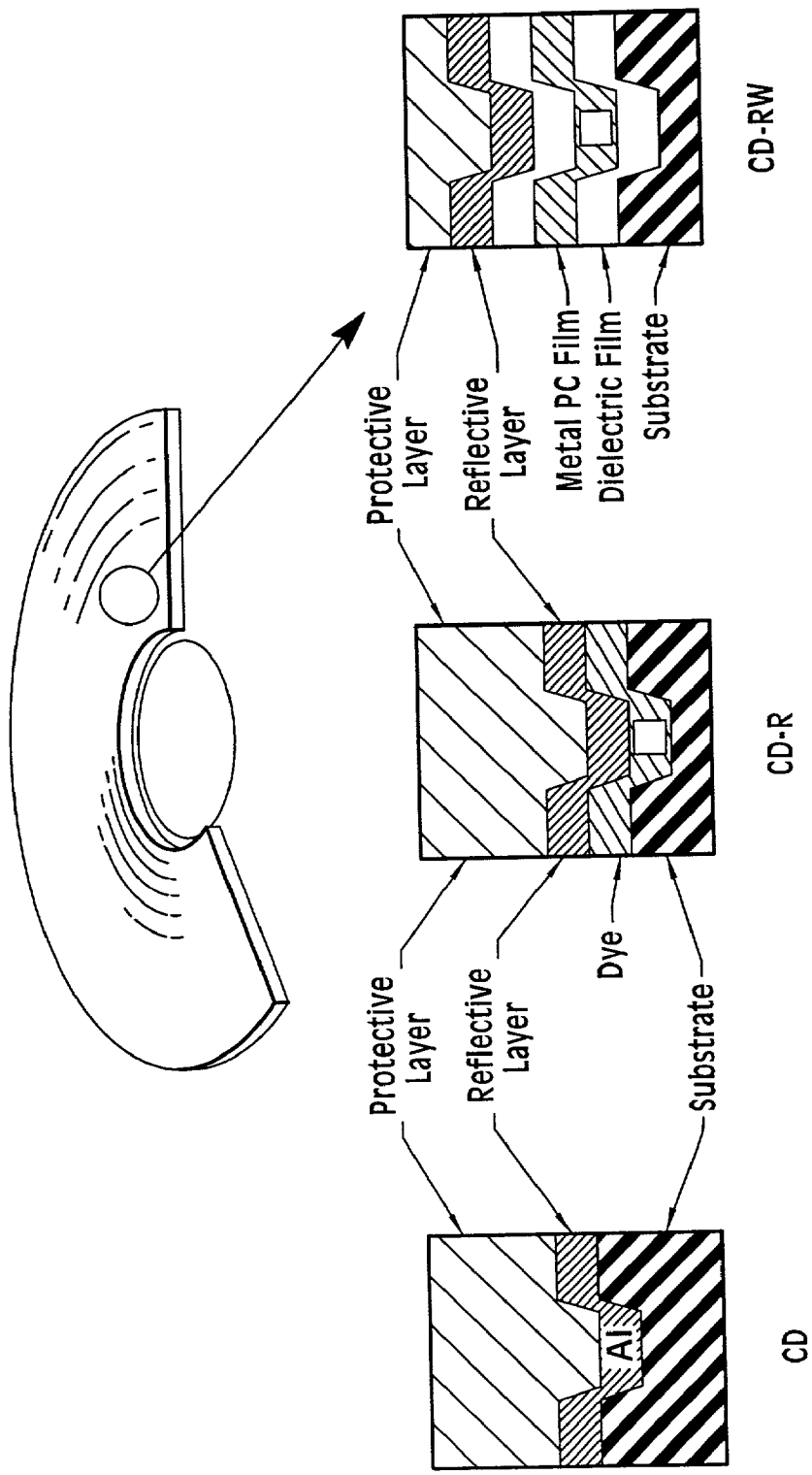
FIG. 1 compares cross-section illustrations of the layers of material that generally make up a CD-ROM, CD-R and CD-RW CD/DVD respectively.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all rights whatsoever. The copyrighted material is from an article by Hugh Bennett, "CD-E: Call it erasable, call it rewritable, but will it fly?" published in *CD-Rom Professional*, September 1996, pages 29–44. The owner of the copyright is Online Inc.

A CD/DVD is a high-volume and long lived data-storage medium. One of the most basic kind of CD/DVDs is a Compact Disc-Read Only Memory (CD-ROM) CD/DVD. It contains an injection-molded polycarbonate plastic substrate containing a spiral track of variable spaced depressions, called pits, separated by undepressed surface called land. Information is retrieved by focusing a low-powered infrared laser beam onto the spiral track of pits and lands in the disc's substrate. The height difference between the pits and the adjacent lands creates a phase shift causing destructive interference in the reflected beam. The effect of these differences in the reflected beam modulates from 30% (pits) to 70% (lands) the intensity of the light returned to a photodiode detector. This modulated high-frequency signal is then manipulated, used for tracking, focus and speed control and then decoded and translated into usable data.

A CD-Recordable (CD-R) CD/DVD will be understood to be a CD/DVD that can be written on, typically by a laser beam as contrasted with a CD-ROM which information is replicated by injection molding. Cyanine, phthalocyanine, and metallized azo dyes are commonly used dyes coated in a polymer binder in the dye layer. The metallized reflective layer typically consists of gold in CD-R and aluminum in CD-ROM. In a CD/DVD writer to write on a CD-R CD/DVD, a laser beam illuminates the dye polymers through the polycarbonate substrate as the disk spins.

Unlike a conventional CD/ROM CD/DVD, the substrate of a CD-R CD/DVD does not contain a track of pits and lands. Instead, the substrate contains a slightly wobbled spiral pregroove. When the disk is rotated at the correct speed under the focused laser beam, the reflected light returned to the photodetector from the pregroove generates a photocurrent providing the critical tracking, motor control and focus signal for the recorder to stay on course. The most important difference between a CD-R CD/DVD and a CD-ROM CD/DVD is the inclusion of a sensitive dye layer in the CD-R to accept the data to be recorded.

Data is written to the CD-R when the heat from the laser causes the dye layer to chemically change at these locations, formatting readable marks in the dye polymer. The degraded dye polymers in the marked regions are less reflective than the unmarked regions. During the reading process, a low-power laser scans the dye polymer layer in a recorded CD-R CD/DVD. The laser light is reflected directly from the unmarked regions, but is scattered or diminished in the marked regions. The written marks in the dye mimic the light-scattering effects of molded CD-ROM pits, modulating the intensity of the light beam returned to the photodiode detector and providing reflectivities close enough (28% and 70%) to a conventional CD-ROM to be read by a device designed to read a CD-ROM.

Unlike CD-R, CD-Rewritable (CD-RW) CD/DVD allows data to be rewritten to a CD/DVD many times over. To accomplish this, CD-RW CD/DVD uses a six-layer design consisting of a polycarbonate substrate, a lower dielectric layer, and a phase-change alloy recording layer, an upper dielectric layer, an aluminum alloy reflector, and a protective lacquer overcoat.

As with CD-R disks, CD-RW CD/DVD uses a polycarbonate substrate into which a spiral pregroove is molded. The real heart of CD-RW CD/DVD technology that makes reusability possible is the recording layer. Consisting of a quaternary phase-change alloy composed of silver, indium, antimony, and tellurium, the system operates on the principle of changing the phase of the recording material between a higher reflective crystalline state and a lower reflective amorphous state. Unlike other phase-change storage implementations available on the market that "burn bright" or write data by creating areas of increased reflectivity on light-scattering background, CD-RW is a "burn dark" system that writes lower reflectivity marks on a reflective surface. This ensures that the resulting track of amorphous marks and crystalline spaces is as optically close as possible to the pattern of pits and lands on a molded CD-ROM CD/DVD.

In its deposited state, phase-change material is amorphous, but CD-RW CD/DVD comes from the factory "pre-initialized" to a crystalline state. CD-RW is a Direct Overwrite (DOW) system, which means new data is recorded over existing information without first erasing what is already there. To write (create a lower-reflectivity mark) to the CD-RW CD/DVD, a powerful (8–14 mW) 780 nm laser beam is focused in the pregroove and the laser energy is absorbed and heats the phase-change alloy to its melting point (600 degrees Celsius). When it cools it revitrifies into the amorphous state to create the phase change. To erase (create a higher-reflectivity mark) on the CD-RW CD/DVD, a lower power (4–8 mg) laser is focused on the pregroove and heats the alloy to its glass transition temperature (200 degrees Celsius). When it cools it forms a crystalline state.

FIG. 1 is a comparative illustration of the layers of a CD-ROM, CD-R and CD-RW CD/DVD respectively. As can be seen, all three have a Substrate layer on the read write surface, a Protective layer on the opposite surface, and a Reflective layer in between the two surface layers. The CD-R and CD-RW CD/DVDs both have a recording layer between the Substrate layer and the Reflective layer: the dye layer being the recording layer in the CD-R CD/DVD and the metal phase change (Metal PC) layer, which consists of a quaternary phase-change metal alloy with silver, indium, antimony and tellurium, being the recording layer in the CD-RW CD/DVD. The CD-RW CD/DVD in addition contains a dielectric film layer on both sides of the Metal PC layer.

The invention relates generally to a method for laser "label"ing a CD-R CD/DVD in what is otherwise a standard CD-R recorder. In one embodiment, the data laser also functions as the labeling laser and the same servo can move the laser for both the data and labeling function. In another embodiment, the recorder would need a low power labeling laser that tracks above the disk (the non-data side) as well as the necessary drive electronics for the labeling laser. In this embodiment, the labeling laser can be moved by the same servo that moves the data laser, or the labeling laser and the data laser can be moved by two separate servos. At the time of data recording, the label pattern, generated by commercially available label generation software, is rasterized (or spiralized) and fed to the labeling-laser. Areas where the labeling laser illuminate the disk, the laser-sensitive coating changes color, leaving a label pattern on the top side of the CD-R CD/DVD.

In the present invention, the CD-R CD/DVD is coated with a laser-sensitive layer comprising thermochromic and/or photochromic materials, such materials being activatable by the labeling laser. Some of the thermochromic materials that can be used in laser labeling CD's are colorant materials such as the ones used in thermal papers, that, when passed through an imaging device with precise measures of heat applied by the print head, undergo a reaction that creates an image on the paper. In "direct" thermography a visible image pattern is formed by imagewise heating of a recording material containing matter that by chemical or physical process changes color or optical density. Most of the "direct" thermochromic recording materials are of the chemical type. On heating to a certain conversion temperature, an irreversible chemical reaction takes place and a colored image is produced.

For simple text or grayscale imaging, essentially the same chemicals used in thermal fax paper can be used in the present invention. For example, the production of a silver metal image on thermal fax paper is by means of a thermally induced oxidation-reduction reaction of a silver soap with a reducing agent. The same process can be used in the present invention.

In yet another embodiment of the present invention, heat sensitive dyes are used. Suitable heat-sensitive dyes for use in the inks of this invention are those which undergo decomposition and hence a visible and permanent color change when exposed to the desired temperature, such as temperatures in the range of from 90° to 120° C. Typical examples of such dyes available and known in the art are Basic Green 4, commercially available as Victoria Green from Keystone Aniline Corp., and Solvent Yellow 56, commercially available as Sudan Yellow 150, from BASF Wyandotte Corp. ((Lent et al., U.S. Pat. No. 4,756,758) Other examples of heat sensitive dyes incorporated into inks that can be used in the present invention include Chemithermal CFBK90 (white to black), Chemithermal CFBK120 (white to black), Chemithermal CFBE90 (white to blue), and Chemithermal CFBE120 (white to blue). Chemithermal CFBK 90 and Chemithermal CFBK120 start to turn black over either 90° C. or 120° C. respectively. Chemithermal CFBE90 and Chemithermal CFBE120 start to turn blue over either 90° C. or 120° C. respectively. Each of the above inks are manufactured by Sherwood Technology Ltd. and can be printed on numerous substrates including: Vellum 80, Rafflacoat, Samuel Jones smoothprint, Adespan Satin 80, JAC Script, treated or primed polypropylene and PET. Another example of heat-sensitive inks are Permanent Temp Tell Ink in Yellow, Red, Blue, Green, Orange, Purple and Black manufactured by International Ink Company. A similar system used with thermal paper is discussed in Lewis et al., U.S. Pat. No. 5,741,592.

In another embodiment of the present invention, dye compositions are used in which imaging is completely effected by thermal means obtained from near infrared radiation. In at least one of such embodiments, the thermally imageable compositions include at least one leuco dye.

The leuco form of the dye in this thermal imaging composition is the reduced form of the dye having one or two hydrogen atoms, the removal of which together with an additional electron in certain cases produces the dye. The classes of such leuco dyes include:

aminotriarylmethanes; aminoxanthenes; aminothioxanthenes; amino-9,10-dihydroacridines; aminophenoxazines; aminophenothiazines; aminodihydrophenazines; aminodiphenylmethanes; leuco indamines; aminohydrocinnamic acids (cyanoethanes, leuco methines) and corresponding esters; hydrozines; leuco indigoid dyes; amino-2,3-dihydroanthraquinones; tetrahalo-p,p'-biphenols; 2(p-hydroxyphenyl)-4,5-diphenylimidazoles; phenethylanilines; indanones and combinations thereof.

Preferred leuco dyes include, but are not limited to, aminotriarylmethanes, aminoxanthenes, and leucoindigoid dyes.

A general preferred aminotriarylmethane class is that wherein at least two of the aryl groups are phenyl groups having an $R^1R^2N$-substituent in the position para to the bond to the methane carbon atom wherein each of $R^1$ and $R^2$ are independently selected from hydrogen, C1–C10 alkyl, 2-hydroxyethyl, 2-cyanoethyl, and benzyl and the third aryl group may be the same as or different from the first two, and when different, is selected from the following:

a) phenyl which can be substituted with lower alkyl, lower alkoxy, chloro, diphenylamino, cyano, nitro, hydroxy, fluoro or bromo;

b) naphthyl which can be substituted with amino, di-lower alkylamino, alkylamino;

c) pyridyl which can be substituted with alkyl;

d) quinolyl;

e) indolinylidene which can be substituted with alkyl.

Preferably, R1 and R2 are hydrogen or alkyl of 1–4 carbon atoms.

Within the category of aminotriarylmethanes, examples include but are not limited to: tris(N,N-dimethylaminophenyl)methane(LCV); * deutero-tris(N,N-dimethylaminophenyl)methane(D-LCV); tris(N,N-diethylaminophenyl)methane(LECV); deutero-tris(4-diethylaminolphenyl)methane (D-LECV); tris(N,N-di-n-propylaminophenyl)methane (LPCV); tris(N,N-din-butylaminophenyl)methane(LBCV); bis(4-diethylaminophenyl)-(4-diethylamino-2-methyl-phenyl)methane(LV-1); bis(4-diethylamino-2-methylphenyl)-(4-diethylamino-phenyl)methane(LV-2); tris(4-diethylamino-2-methylphenyl)methane(LV-3); deutero-bis(4-diethylaminophenyl)-(4-diethylamino-2-methylphenyl) methane(D-LV-1); deutero-bis(4-diethylamino-2-methylphenyl)(4-diethylaminophenyl)methane(D-LV-2); bis(4-diethylamino-2-methylphenyl)(3,4-dimethoxyphenyl) methane(LB-8); aminotriarylmethane leuco dyes having different alkyl substituents bonded to the amino moieties wherein each alkyl group is independently selected from C1–C4 alkyl; and aminotriaryl methane leuco dyes with any of the preceding named structures that are further substituted with one or more alkyl groups on the aryl rings wherein the latter alkyl groups are independently selected from C1–C3 alkyl.

*deutero (D)=deuterated, i.e. containing deuterium

Preferred amino triarylmethane leuco dyes are D-LECV, LV-1, LV-2, D-LV-1, and D-LV-2. The most preferred aminotriarylmethane leuco dyes are LV-1 and LV-2. Trans-3-hydroxy-2-(p-diethylaminobenzyl)indanone (LY-1) is a member of category (1) of leuco dyes as listed above. Benzo((a)-6-N,N-diethylamino-9-(2-methoxycarbonyl)-phenylxanthene(LM-5) is a member of category (b) of leuco dyes and is also more preferred.

Examples of aminotriarylmethane leuco dyes are illustrated by chemical structures I through VII below.

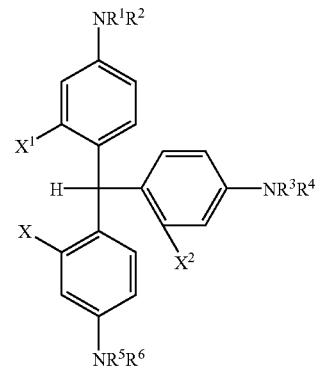

I

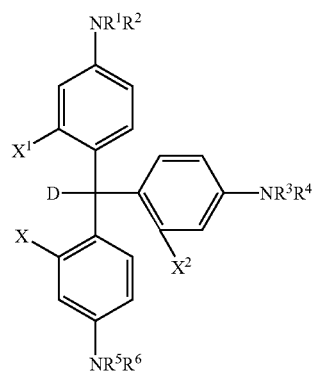

II

For chemical structures I and II:

a) X, $X^1$ and $X^2$ are H; $R^1$ through $R^6$ are H.

b) X, $X^1$ and $X^2$ are H; $R^1$ through $R^6$ are $CH_3$.

c) X, $X^1$ and $X^2$ are H; $R^1$ through $R^6$ are $C_2H_5$.

d) X, $X^1$ and $X^2$ are H; $R^1$ through $R^6$ are independently selected from H and C3–8 alkyl.

e) X and $X^1$ are H; $X^2$ is $CH_3$; $R^1$ through $R^6$ are independently selected from H and C1–C8 alkyl.

f) X is H; $X^1$ and $X^2$ are $CH_3$; $R^1$ through $R^6$ are independently selected from H and C1–C8 alkyl.

g) X, $X^1$ and $X^2$ are H; $R^1$, $R^3$ and $R^5$ are independently selected from aryl C6–C10; substituted C6–C10 aryl; and $R^2$, $R^4$, and $R^6$ are H.

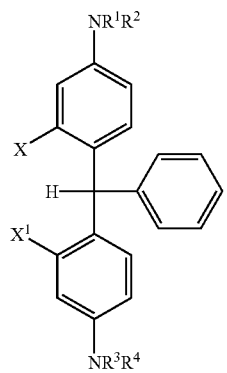

III

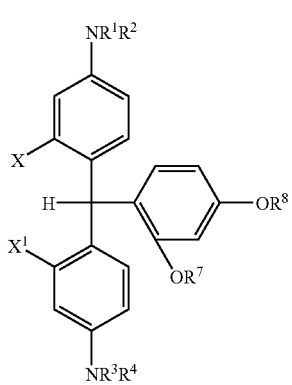

IV

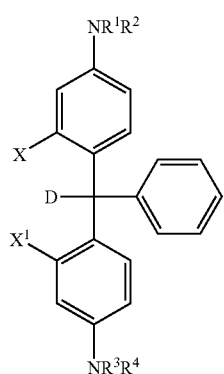

V

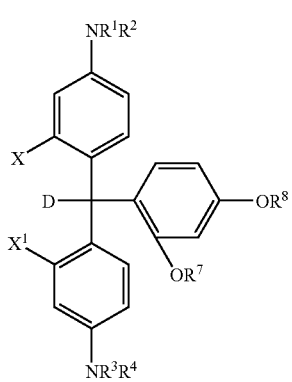

VI

For chemical structures III through VI:
a) X and X¹ are H; and R¹ through R⁴ are independently selected from H and C1–C8 alkyl
b) X and X¹ are H and R¹ and R³ are aryl; and R² and R⁴ are H
c) X=CH₃, X¹=H and R¹ through R⁴ are independently selected from H and C1–C8 alkyl; and R⁷ and R⁸ are independently selected from C1–C8 alkyl, or R⁷ and R⁸ are bridged to form a cyclic attachment with a CH₂— or C₂H₄— bond, thereby forming a five- or six-membered ring, respectively

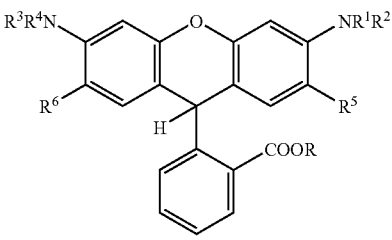

VII

For chemical structure VII:
a) R is independently selected from H, C1–C8 alkyl; R⁵ and R⁶ are independently selected from H and C1–C4 alkyl; R¹ through R⁴ are independently selected from H and C1–C6 alkyl, C6–C10 aryl with the proviso that, if R¹ and R³ are aryl, then R² and R⁴ are hydrogen Preferred leuco dyes include, but are not limited to, aminotriarylmethanes and aminoxanthenes.

The leuco dye(s) can be present in the compositions in the amount of at least about 3% by weight, preferably about 4 to about 20% by weight.

A variety of different near IR-absorbing dyes that are effective in absorbing near IR radiation and converting it efficiently to heat (thermal energy) can be employed in this invention. Specific suitable near IR-absorbing dyes for this invention include, but are not limited to, DF-1, SQS, RD-1 as defined below.

DF-1: 2-((2-((2-chloro-3-(((1,3-dihydro-1,3,3-trimethyl-2H-indol-2-ylidene)ethylidene)-1-cyclopenten-1-yl)ethenyl)-1,3,3-trimethyl-3H-indolium trifluoromethanesulfonate;

RD-1: Cyasorb® IR-165 Near IR Dye, American Cyanamid Co., Wayne, N.J. 07470 (absorption maximum at 1070 nm)

SQS 4((((3-((((2,6-bis(1,10-dimethylethyl)-4H-thiopyrann-4-ylidene)methyl)-2-methyl)2-hydroxy-4-oxo-2-cyclobuten-1-ylidene)methyl-2,6-bis(1,1-dimethylethyl)thiopyrilium hydroxide, inner salt, Pisgah Labs, Pisgah Forest, N.C. DF-1 and RD-1 are preferred near IR-absorbing dyes, and DF-1 is more preferred.

In addition to specific dyes as listed above, other suitable near IR dyes for this invention include, but are not limited to, those shown below:

1. Heptamethine Cyanine Dyes Having a Chemical Structure (VIII) as Shown Below:

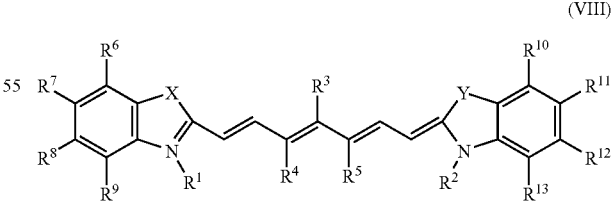

(VIII)

where R3 can be H, halogen, alkyl, aryl, aryl, alkoxy, aryloxy, thioalkyl, or thioaryl; R4 and R5 are independently selected from H, alkyl, aryl, or are bridged to form a cyclic attachment; each of R6 through R13 is independently selected from H, alkyl aryl, or any two adjacent R6 through R9 and any two adjacent R10 through R13 can form R10 through R13 can form a fused aryl; each of R1 and R2 are independently selected from alkyl, aryl and substituted alkyl; X and Y, which may or may not be identical, are each represented by the formula CR'R' where R', R" are independently selected from alkyl, aryl and substituted alkyl; X and Y, which may or may not be identical, are each represented by the formula CR'R" where R', R" are independently selected from H, C1–C6 alkyl, O, S, Se and Te. Choice of counterion for actionic dyes is dictated mainly by solubility requirements. Acceptable counterions include but at not limited to triflate, tosylate, perchlorate, hexafluorophosphate, tetrafluoroborate, iodide, chloride, bromide.

2. Benzenaminium Dyes Having a Chemical Structure (IX) as Shown Below:

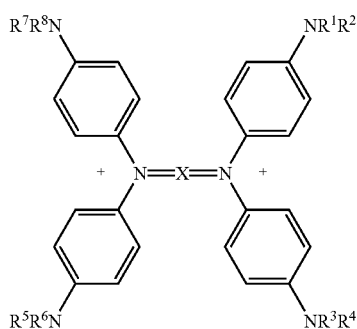

(IX)

wherein each of $R^1$ through $R^8$ is independently selected from C1–C6 alkyl; X is a substituted 1,4-cyclohexadiene.

3. Squarylium Dyes Having Structure (X) or Structure (XI) as Shown Below:

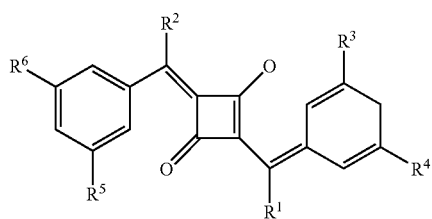

(X)

wherein each of R1 through R6 is independently selected from H, C1–C6 alkyl; X and Y are independently selected from O, S, Se, Te, N—R7, wherein R7 is selected from C1–C6 alkyl.

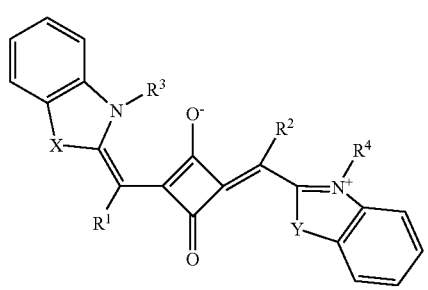

(XI)

wherein each of R1 and R2 is independently selected from H, C1–C6 alkyl; each of X and Y is independently selected from O, S, Se, Te, N—R7, wherein R7 is selected from C1–C6 alkyl; each R3 and R4 is independently selected from alkyl, aryl or substituted alkyl. The benzene rings in structure (XI) may be further substituted.

The near IR-absorbing dye(s) is present in the compositions to absorb near IR radiation, which is subsequently converted to heat (thermal energy). The heat produced is primarily responsible for initiation of the color forming reactions that occur in forming the image. The near IR-absorbing dyes may be selected from the group consisting of:

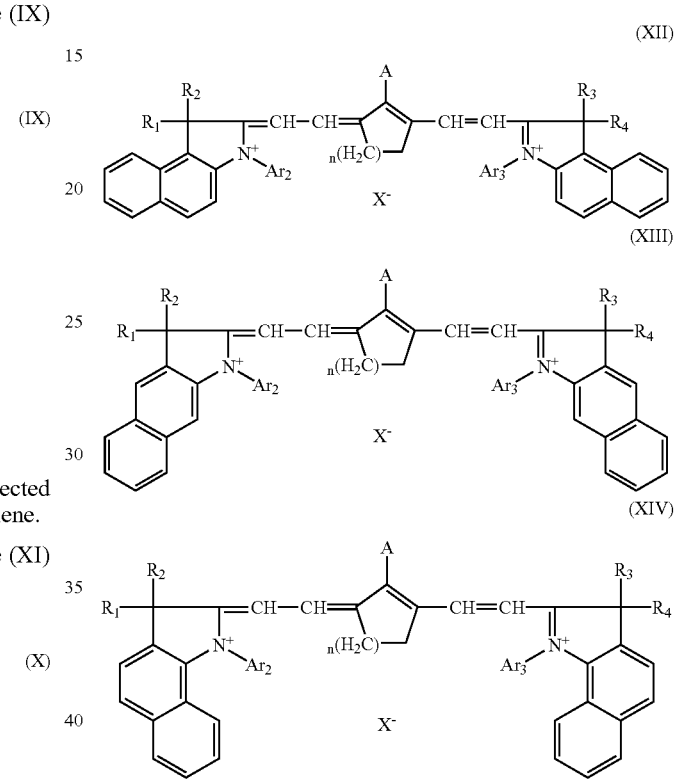

wherein R1–R4 are independently substituted or unsubstituted C1–C6 alkyl; A is substituted or unsubstituted phenyl, naphthyl, C1–C6 alkyl, or C7–C10 aralkyl; Ar2 and Ar3 are independently substituted or unsubstituted phenyl or naphthyl; X is a monovalent anion; and n is 1 or 2. Imaging of the composition is by thermal means involving exposing with near IR radiation with the proviso that the composition is not imaged by UV means. In the near IR-absorbing dye structures given above that are substituted, the substitution of alkyl, aryl, or aralkyl groups independently can be with substituents that include, but are not limited to, hydroxy, alkoxy, chloro, bromo, cyano, and amino. Suitable near IR-absorbing dyes include, but are not limited to 2-(2(3-((1,1-dimethyl-1,3-dihydro-3-phenyl-2H-benz(e)indol-2-ylidene)ethylidene)-2-phenyl-1-cyclohexen-1-yl)ethenyl)-1,1-dimethyl-3-phenyl-1H-benz(e)indolium p-toluenesulfonate (JC-1); 2-(2(3-((1,1-dimethyl-1,3-dihydro-3-phenyl-2H-benz(e)indol-2-ylidene)ethylidene)-2-phenyl-1-cyclopenten-1-yl)ethenyl)-1,1-dimethyl-3-phenyl-1H-benz(e)indolium p-toluenesulfonate (JC-2); 2-(2(3-((1,1-dimethyl-1,3-dihydro-3-phenyl-2H-benz(f)indol-2-ylidene)ethylidene)-2-phenyl-1-cyclohexen-1-yl)ethenyl)-1,1-dimethyl-3-phenyl-1H-benz(f)indolium p-toluenesulfonate (JC-3); 2-(2(3-((1,1-dimethyl-1,3-dihydro-3-phenyl-2H-benz(f)indol-2-ylidene)ethylidene)-2-phenyl-1-cyclopenten-1-yl)ethenyl)-1,1-dimethyl-3-phenyl-1H-benz(f)indolium p-toluenesulfonate (JC-4); 2-(2(3-((1,1-dimethyl-1,3-dihydro-3-phenyl-2H-benz(g)indol-2-ylidene)ethylidene)-2-phenyl-1-cyclohexen-1-yl)ethenyl)-1,1-dimethyl-3-phenyl-1H-benz(g)indolium p-toluenesulfonate (JC-5); 2-(2(3-((1,1-dimethyl-1,3-dihydro-3-phenyl-2H-benz(g)indol-2-ylidene)ethylidene)-2-phenyl-1-cyclopenten-1-yl)ethenyl)-1,1-dimethyl-3-phenyl-1H-benz(g)indolium p-toluenesulfonate (JC-6). These dyes are benz(e, f, or g)indolium-type dyes, which respectively have the structures listed in the order one, two, and three in the Markush groups of the structures given above.

The benz(e)indolium-type dyes are preferred as a general class. Specific preferred dyes are JC-1 and JC-2. The most preferred near IR-absorbing dye is JC-1.

In another embodiment of the present invention, dyes can be polymer-microencapsulated in heat sensitive polymers such as: styrene-butylacrylate-PEG acrylate emulsion and other blends of polymers such as polyurethanes, acrylates, and styrenes. Heat can be applied to the medium while the medium is being printed with the microencapsulated dyes. In a preferred embodiment, such heat sensitive polymers used to microencapsulate dyes have Tg's in the range of from 80° to 200° C. Tg is defined as the temperature corresponding to the midpoint in color density during decoloration.

With the above embodiment, it is possible to achieve multi-colored or writeable/rewriteable images on the CD/DVD. This can be done by preparing the CD/DVD label surface with areas of microencapsulated dyes having different Tg's, as described above. According to how these different dyes are laser-activated, specific multicolored patterns and designs are achieved on the CD/DVD surface.

Other similar embodiments of the invention can be achieved with laser activatable dyes, such as those disclosed herein, which can be rendered bistable in combination with known developers (U.S. Pat. No. 6,022,648, Jacobson et al., MIT). Such bistable dyes may have, for example, an activation temperature and a different deactivation temperature. Thus a dye which is first laser activated on the surface of a CD/DVD may later be laser deactivated. Therefore a laser labeled image on a CD/DVD can be erased. Furthermore, with a combination of dyes on the CD/DVD, one laser labeled image can be erased and another laser labeled image can obtained on the same surface.

In another embodiment of the present invention, photochromic infrared (IR) sensitive dyes such as 3'phenyl-7-diethylamino-2,2'-spirodi-(2H-1-benzopyran) can be used in the laser-sensitive layer. Examples of inks incorporating such IR-sensitive dyes are IR 10000FBK (white to black), IR 10000FBE (white to blue), IR 10000GBK (white to black), and IR 10000GBE (white to blue), each of which are designed to be imaged using a 10000 nm $CO_2$ laser. These inks are manufactured by Sherwood Technology Ltd. and designed to be applied with a Flexo (IR 10000FBK and IR 10000FBE) or Gravure (10000GBK and 10000GBE) printing technique. These inks can be applied to numerous substrates such as uncoated paper, coated paper, PET, OPP, PE and Cellophane. Furthermore, organic substances that are capable of altering their absorption characteristics with respect to actinic light in the range from 300 to 420 nm are known to be useful in inks printed on mask films. Examples of these organic substances include aromatic amines, aromatic phenols, cyanines, merocyanines, aromatic triazoles, aromatic lactones and aromatic lactams (in the acidic or basic form in each case), stilbenes, azomethines and oxidizable aromatic hydrols. Preferred examples include: Michler's ketone, p-dimethylaminobenzaldehyde or its hydrochloride, o-hydroxyphenylbenzotriazole, o-hydroxybenzophenone or its sodium phenolate, 4,4'-bis(dimethylamino)benzhydrol and tetraphenylethylene. More preferred examples include aromatic amines and their hydrochlorides. (Barzynski et al., U.S. Pat. No. 4,515,877)

Examples of chromogenic photosensitive materials useful in the present invention include, but are not limited to, colorless electron donating type dye precursor compounds which react with a developer compound to generate a dye. Representative examples of such color formers include substantially colorless compounds having in their partial skeleton a lactone, a lactam, a sulfone, a spiropyran, an ester or an amido structure. Specifically, there are triarylmethane compounds, bisphenylmethane compounds, xanthene compounds, xanthene compounds, thiazine compounds, spiropyran compounds and the like. Typical examples of them include Crystal Violet lactone, benzoyl leuco methylene blue, Malachite Green Lactone, p-nitrobenzoyl leuco methylene blue, 3-dialkylamino-7-dialkylamino-fluoran, 3-methyl-2,2'-spirobi(benzo-f-chrome), 3,3-bis(p-dimethylaminophenyl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis(1,2-dimethylindole-3-yl-5-dimethylaminophthalide, 3,3-bis-(1,2-dimethylindole-3-yl)6-dimethylaminophthalide, 3,3-bis-(9-ethylcarbazole-3-yl)-5-dimethylaminophthalide, 3,3-bis(2-phenylindole-3-yl)-5-dimethylaminophthalide, 3-p-dimethylaminophenyl-3-(1-methyl pyrrole-2-yl)-6-dimethylaminophthalide, 4,4'-bis-dimethylaminobenzhydrin benzyl ether, N-halophenyl leuco Auramine, N-2,4,5-trichlorophenyl leuco Auramine, Rhodamine-B-anilinolactam, Rhodamine-(p-nitroanilino) lactam, Rhodamine-B-(p-chloroanilino)lactam, 3-dimethylamino-y-methoxyfluoran, 3-diethylamino-7-methoxyfluoran, 3-diethylamino-7-(acetylmethylamino)fluoran, 3-diethylamino-7-(dibenzylamino)fluoran, 3-diethylamino-7-(methylbenzylamino)fluoran, 3-diethylamino-7-(chloroethylmethylamino)fluoran, 3-diethylamino-7-(diethylamino) fluoran, 3-methyl-spiro-dinaphthopyran, 3,3'-dichloro-spiro-dinaphthopyran, 3-benzyl-spiro-dinaphthopyran, 3-methyl-naphtho-(3-methoxybenzo)-spiropyran, 3-propyl-spirodibenzoidipyran, etc.

Useful dyes can form a photo-reductive complex with a borate anion and are cationic methine, polymethine, triarylmethane, indoline, thiazine, oxazine and acridine dyes. More preferably, the dyes are cationic cyanine, carbocyanine, hemicyanine, rhodamine and azomethine dyes.

Useful cationic dyes are the cyanine dyes represented by the following formula (XX);

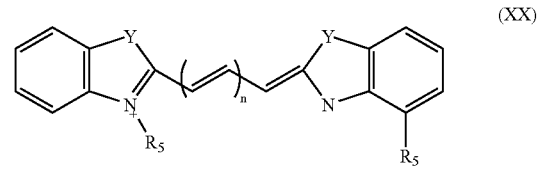

(XX)

wherein n is 0, 1, 2 or 3; R5 represents an alkyl group; and Y represents CH=CH, N—CH3, C(CH3)2, O, S or Se.

Examples of the dye precursor to be used in the present invention may include a colorless electron-donative compound. Representative examples of this compound may include a substantially colorless compound that has a lactone, lactam, sulfone, spiropyran, ester, or amide structure in the partial skeleton thereof. For example, they may be triarylmethane compounds, bisphenyl methane compounds, xanthene compounds, fluoran compounds, thiazine compounds or spiropyran compounds. Next, specific examples of dye precursors, which develop yellow, magenta and cyan colors, are given.

Yellow dye precursors

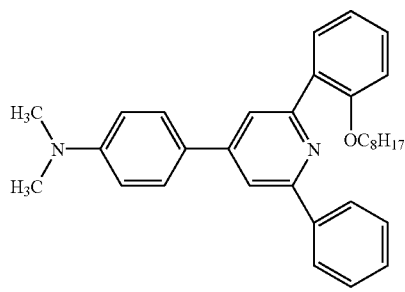
(XXI)

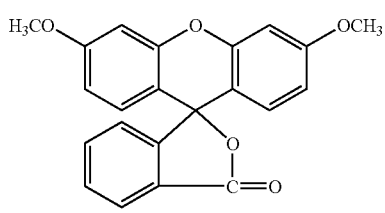
(XXII)

Magenta dye precursors

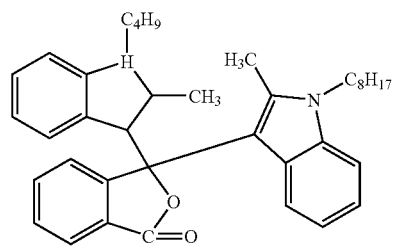
(XXIII)

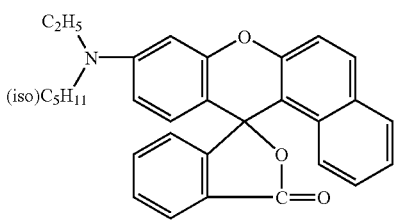
(XXIV)

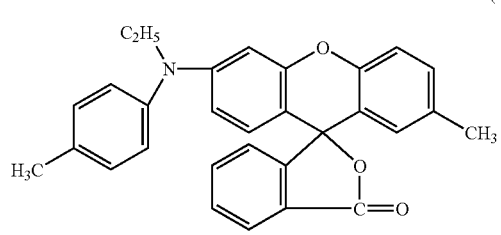
(XXV)

Cyan dye precursors

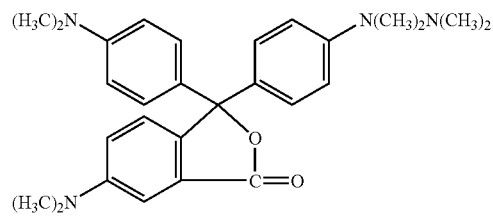
(XXVI)

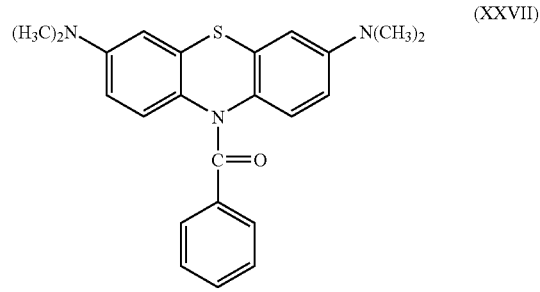
(XXVII)

Other infrared sensitive cationic dyes are listed as follows, where "Ph" indicates a phenyl group, "Me" indicates a methyl group, "Bu" indicates a butyl group, and "Et" indicates an ethyl group:

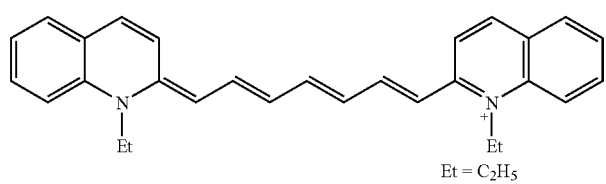
(XXVIII)

-continued
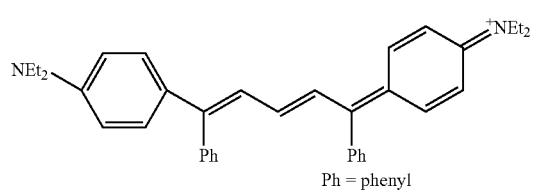 (XXIX)
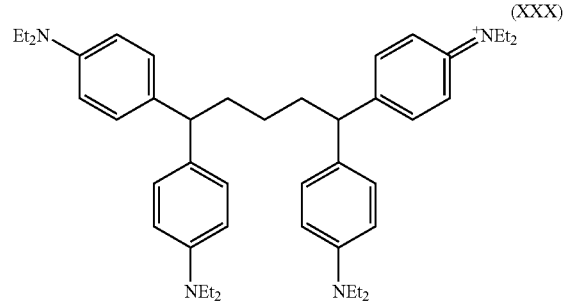 (XXX)
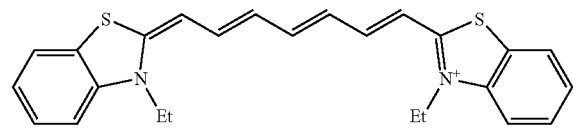 (XXXI)
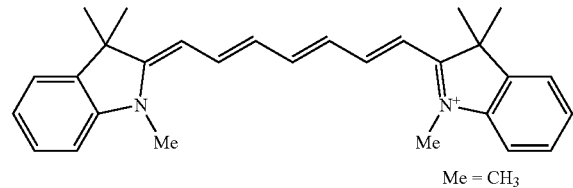 (XXXII)
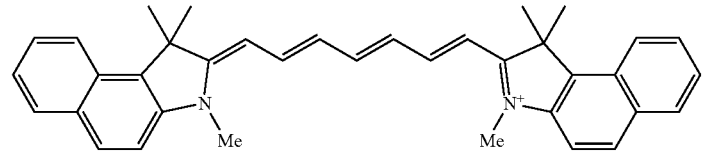 (XXXIII)
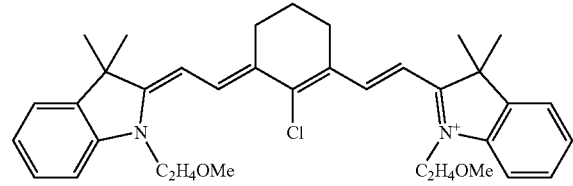 (XXXIV)
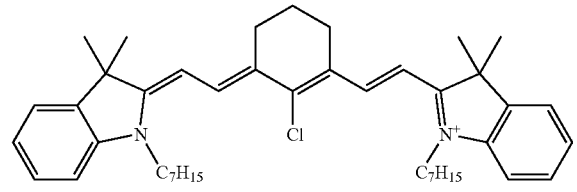 (XXXV)
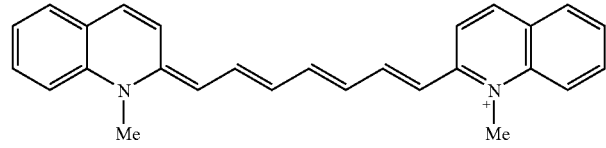 (XXXVI)
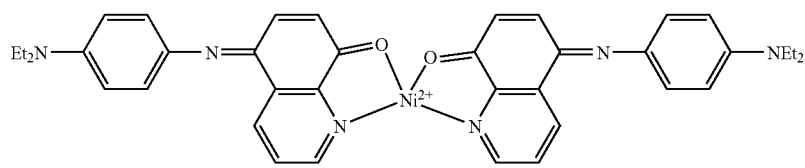 (XXXVII)

-continued
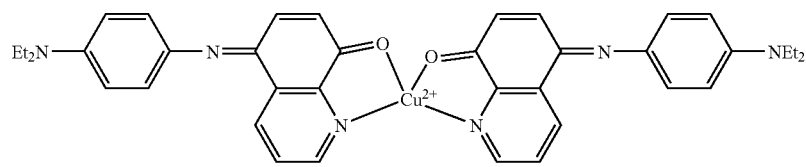
(XXXVIII)
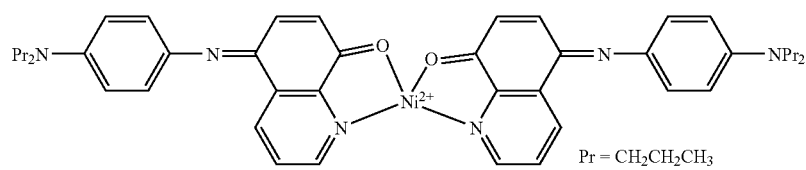
(XXXIX)
Pr = CH₂CH₂CH₃
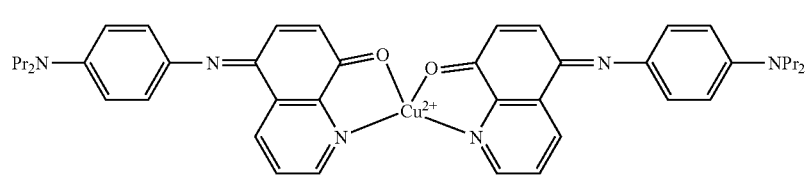
(XL)
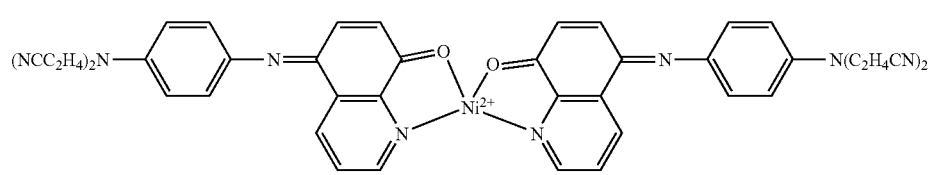
(XLI)
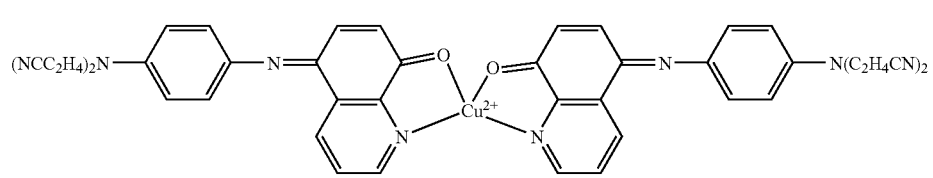
(XLII)
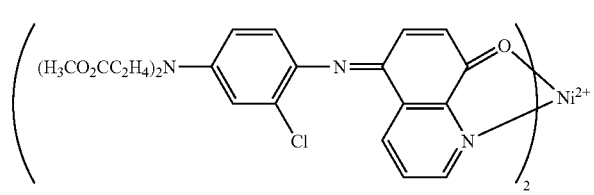
(XLIII)
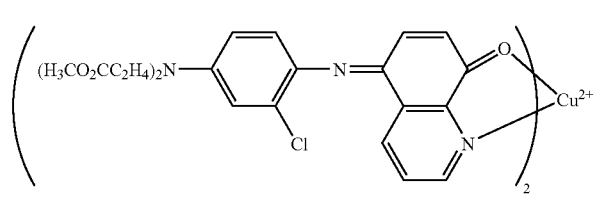
(XLIV)
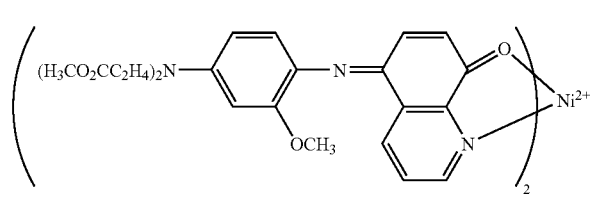
(XLV)

-continued

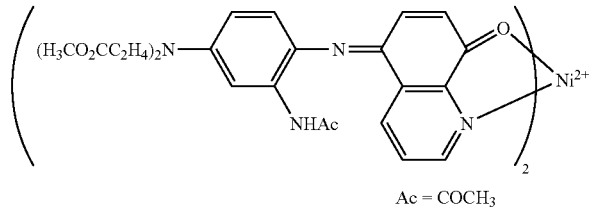
(XLVI)

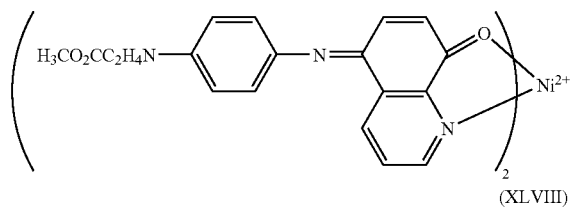
(XLVII)

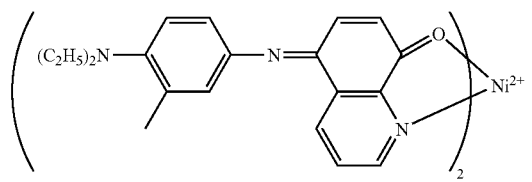
(XLVIII)

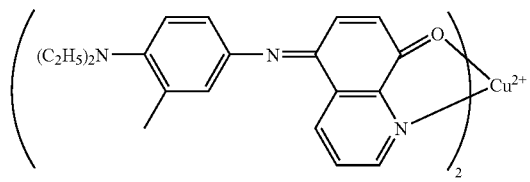
(XLIX)

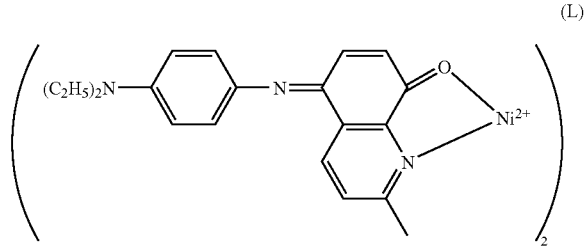
(L)

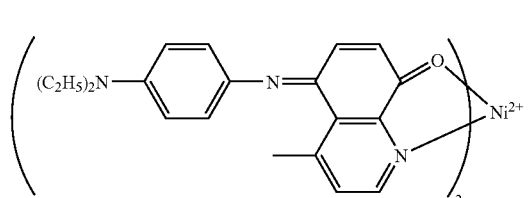
(LI)

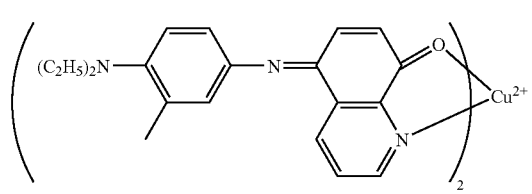
(LII)

In a preferred embodiment of the present invention, there is a passive, transparent layer over the laser-sensitive layer for mechanical protection.

In another preferred embodiment of this invention, the laser beam used for recording the image data on the surface of the medium comprises an infrared laser.

In the normal CD-R and CD-RW read write drive mechanisms the optical recording device, such as an infrared laser beam, records write data on the medium by interacting with the material of the medium to produce a phase change in the material, resulting in change in reflectance. In a preferred embodiment of the present invention, image data is recorded on the medium, specifically on irreversibly thermochromic and irreversibly photochromic materials. When the infrared laser beam interacts with the thermochromic and/or photochromic materials, a permanent color change is produced. The pulse duration of the infrared beam and hence resulting temperature can be adjusted using proper controllers and programs. It is possible to choose materials that change color at certain temperatures. Therefore, producing the necessary differing colors for the image depends on a differential in temperature. The temperature-produced color is used to make multicolored images from a single coating, when the single coating incorporates the necessary chemistry to produce all the desired colors. For example, cyan, magenta and yellow dyes may be activated differentially at a given location based on pulse duration.

In a preferred embodiment of the invention, various microcapsule materials, each activated by releasing the encapsulated dye particles at a different temperature, can be used to encapsulate different colored dyes on the surface of the medium. Such a technique using microencapsulation of dye particles with differentially activatable microcapsules allows full color production of images to the resolution of micron scale dots, since the laser can scan the CD/DVD at the resolution of a micron line.

Figure 2:
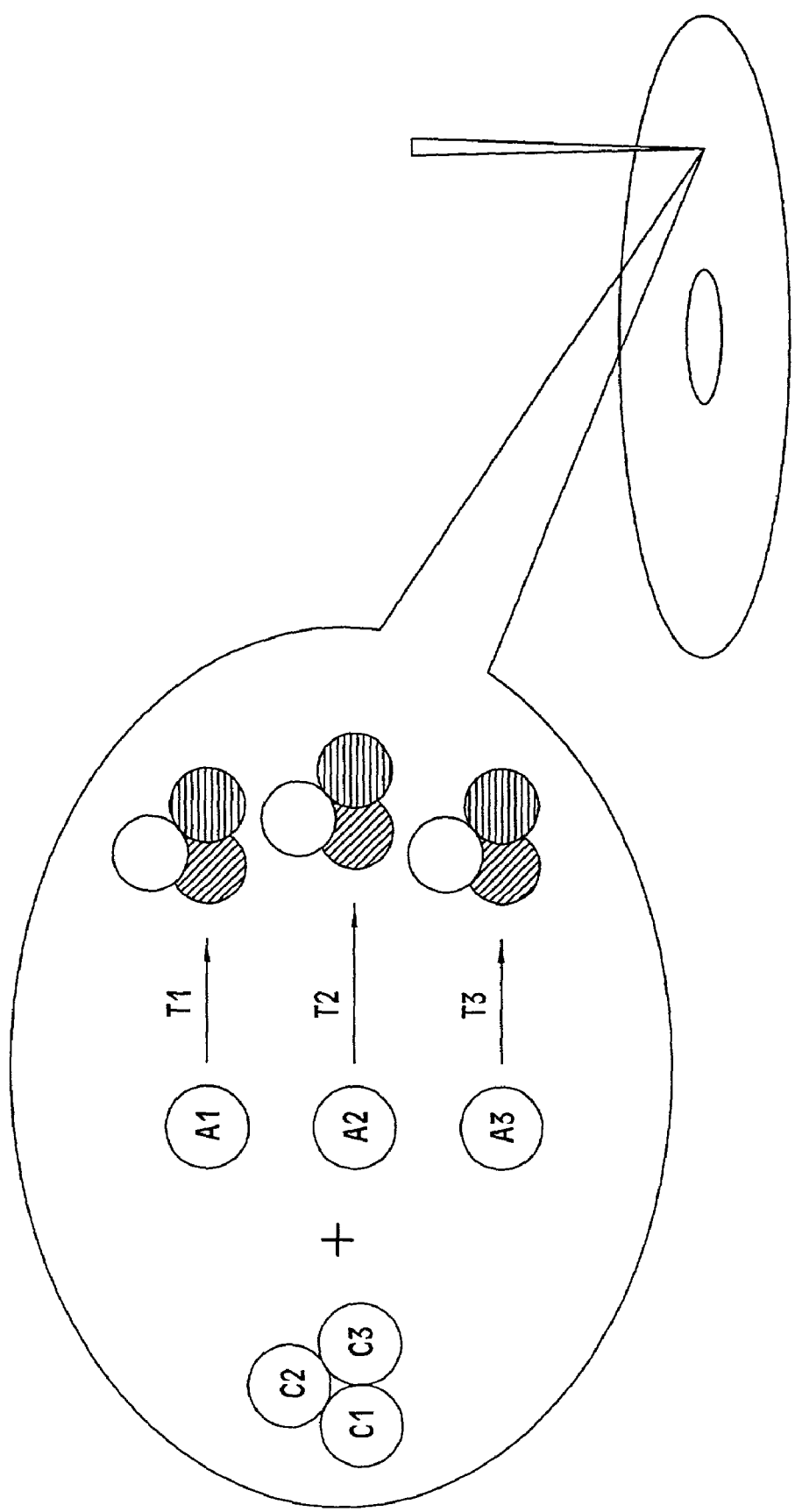
FIG. 2 schematically illustrates how different results can be achieved on the surface of a CD/DVD when specific combinations of colors are encapsulated with specific microcapsule materials which in turn are activated at different temperatures.

FIG. 2 shows how specific combinations of colors: C1, C2 and C3, are encapsulated with specific microcapsule materials: A1, A2, and A3 which in turn are activatable at different temperatures: T1, T2 and T3 respectively. Thus, each different combination of colors is released when the laser is applied to the specific area where that combination of colors is and the specific temperature is achieved in that specific area which is necessary to burst the microcapsule material encapsulating that combination of colors. The result is a very high-resolution placement on the medium of differently colored micron scale dots to achieve a precise image.

Figure 3:
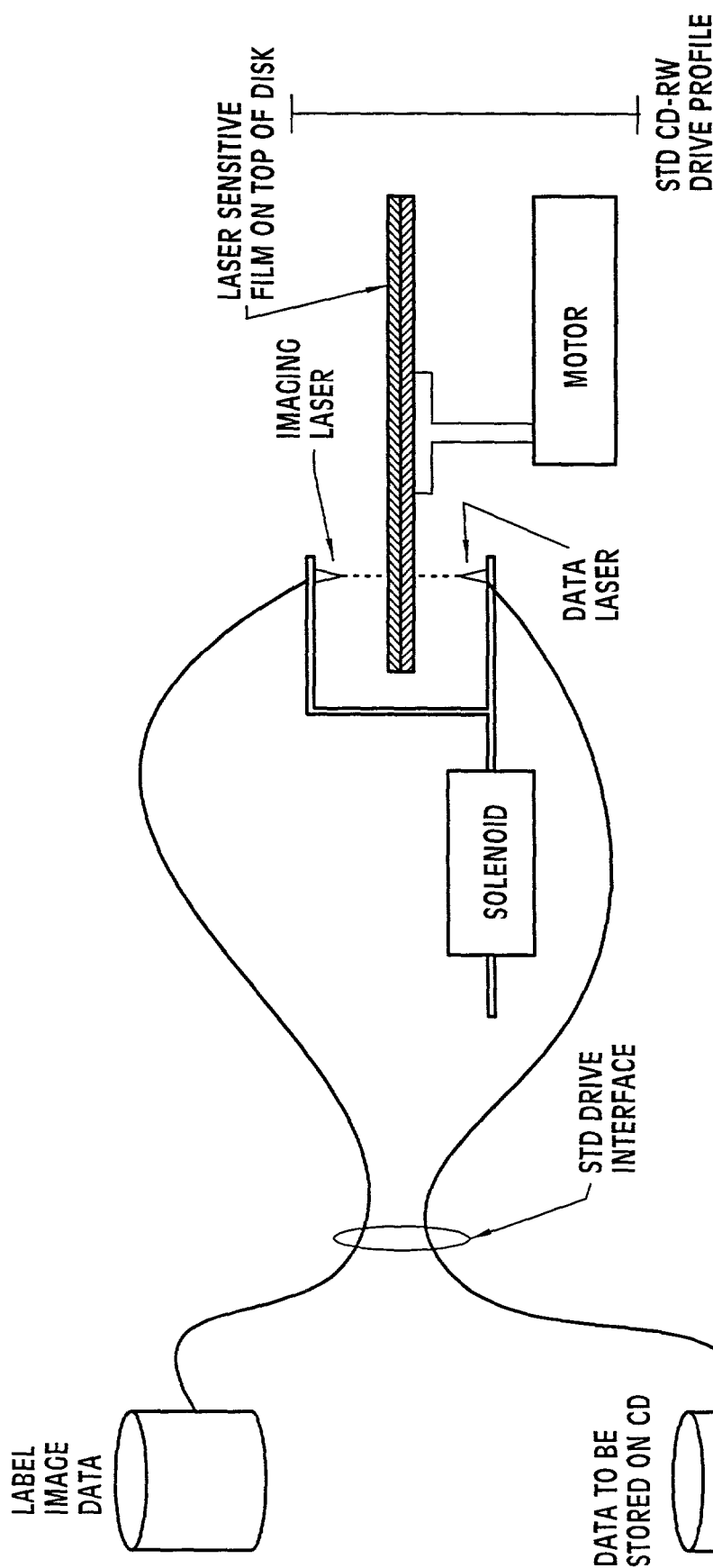
FIG. 3 is a schematic diagram of the Integrated CD/DVD Writer-Labeler system of the present invention.

FIG. 3 is a schematic diagram of the Integrated CD/DVD Writer-Labeler system of the present invention. The read data information to be recorded on the CD-R is stored in a Read Data storage location. The image data information to be recorded on the visible label on the CD-R CD/DVD is stored in the Image Data storage location. To transfer the digital information, either the Read Data or the Image Data, from their respective storage locations, a controller is placed in communication with the storage locations. A single interface is positioned between the storage locations and the laser device. Digital information from either of the storage locations is transferred via a digital data stream to the data laser emitter and/or the imaging laser emitter, the emitter(s) being two separate emitters in the embodiment shown in FIG. 3. In another embodiment, the data laser and imaging laser function are combined into one emitter. The read data stream is beamed onto the read/write side of the CD-R CD/DVD as the disk spins around on the turntable propelled by the CD-R drive motor. At the same time that the read data stream is beamed onto the read/write substrate side of the CD-R CD/DVD, or at a different time, either before or after the read data stream is beamed, the image data stream is beamed onto the side opposite the read/write substrate side.

Therefore, this combination of materials incorporated into a coating combined with laser writing provides for a powerful imaging technique for imaging a CD/DVD. This is especially so since CD writers are already currently equipped with a laser. Furthermore, CD-R's are amenable to ready adoption of the coatings. Past methods of CD/DVD labeling have been cumbersome and involve label transfer or special label printers. In contrast, the preferred embodiment of the present invention relates to a CD writer with direct imaging facility. This provides to the consumer the capability to image specialized personal labels on the CD/DVD.

EXAMPLES

Example 1

Preparation of Polymer-Encapsulated Dye 2.0 g of Neozapon Red 335 (a metal complex dye made by BASF, containing Cr(III) and C.I.Solvent Red 122), 10 g of MMA (methyl methacrylate), 1.0 g of MES (2-(N-Morpholino)-ethane sulfonic acid), 1.0 g of 30% Rhodafac (a phosphate ester surfactant made by Rhone Poulenc), and 3 g of water were combined together to form an emulsion. An additional 34 g of water was heated to 90° C. 0.1 g of KPS (potassium persulfate) was added to the water, then the emulsion was added to the water over a period of 10 minutes. When the temperature of the combined mixture reached 45° C., one gram of ~17.5xKOH (potassium hydroxide) was added. The combined mixture was then filtered and ~1.8 g of precipitate was collected from the combined mixture.

Example 2

Bulk Polymerization of Polymer-Encapsulated Dye 0.4 g of Neozapon Red 335, 9 g of MMA, 1.0 g of MES, 2.8 g of 30% Rhodafac, 0.11 g of KPS and 75 g of water were combined together heated to 90° C. for one hour and cooled. When the temperature had cooled, one gram of ~17.5xKOH (potassium hydroxide) was added. The combined mixture was then filtered and ~0.1 g of precipitate was collected from the combined mixture.

Example 3

Testing of Microencapsulated 2 Part Composition

A dot consisting of a thin (10 micron) film of thermal reactive white to black 190 ink (340-0699) was coated on a sheet of aluminum using a roller. The aluminum film was mounted on a glass slide equipped with a thin film heater and a thermocouple. The heater was heated at 10C./min to 170 C. A distinctive color change from white to black at 150 was observed which further darkened at 170C. The heating was terminated at 170 C. The cooled film retained the black mark at room temperature.

The invention claimed is:

1. A CD/DVD recording medium comprising, on at least one surface, laser sensitive materials selected from comprising at least one of the group consisting of infrared sensitive dyes and near infrared absorbing heat sensitive dyes;
    wherein the at least one surface comprises at least one image recording area having at least one labeling surface, the at least one labeling surface comprising the laser sensitive materials;
    and wherein the laser sensitive materials are for labeling the at least one surface of the recording medium and not for primary data storage.

2. The recording medium of claim 1 wherein the infrared sensitive dyes comprise 3'phenyl-7-diethylamino-2,2'-spirodi-(2H-1-benzopyran); IR 10000 FBK; IR 10000 FBE; IR 10000 GBK; and IR 10000 GBE.

3. The recording medium of claim 1 wherein the infrared sensitive dyes comprise colorless electron donating type dye precursor compounds which react with a developer compound to generate a dye.

4. The recording medium of claim 3 wherein the colorless electron donating type dye precursor compound has at least one of a lactone, a lactam, a sulfone, a spiropyran, an ester or an amido structure.

5. The recording medium of claim 3 wherein the colorless electron donating type dye precursor compound is selected from the group consisting of triarylmethane compounds, bisphenyl-methane compounds, xanthene compounds, xanthene compounds, thiazine compounds, spiropyran compounds and the like.

6. The recording medium of claim 5 wherein the colorless electron donating type dye precursor compound is selected from the group consisting of Crystal Violet lactone, benzoyl leuco methylene blue, Malachite Green Lactone, p-nitrobenzoyl leuco methylene blue, 3-dialkylamino-7-dialkylaminofluoran, 3-methyl-2,2-spirobi(benzo-f-chrome), 3,3-bis(p-dimethylaminophenyl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis(1,2-dimethylindole-3-yl-5-dimethylaminophthalide, 3,3-bis-(1,2-dimethylindole-3-yl)6-dimethylaminophthalide, 3,3-bis-(9-ethylcarbazole-3-yl)-5-dimethylaminophthalide, 3,3-bis(2-phenylindole-3-yl)-5-dimethylaminophthalide, 3-p-dimethylaminophenyl-3-(1-methyl pyrrole-2-yl)-6-dimethylaminophthalide, 4,4'-bis-dimethylaminobenzhydrin benzyl ether, N-halophenyl leuco Auramine, N-2,4,5-trichlorophenyl leuco Auramine, Rhodamine-B-anilinolactam, Rhodamine-(p-nitroanilino)

lactam, Rhodamine-B-(p-chloroanilino)lactam, 3-dimethylamino-y-methoxyfluoran, 3-diethylamino-7-methoxyfluoran, 3-diethylamino-7-(acetylmethylamino)fluoran, 3-diethylamino-7-(dibenzylamino)fluoran, 3-diethylamino-7-(methylbenzylamino)fluoran, 3-diethylamino-7-(chloroethylmethylamino)fluoran, 3-diethylamino-7-(diethylamino) fluoran, 3-methyl-spiro-dinaphthopyran, 3,3'-dichloro-spiro-dinaphthopyran, 3-benzyl-spiro-dinaphthopyran, 3-methyl-naphtho-(3-methoxybenzo)-spiropyran, 3-propyl-spirodibenzoidipyran, and combinations thereof.

7. The recording medium of claim 1 wherein the infrared sensitive dyes are cyanine dyes represented by the following formula (XX);

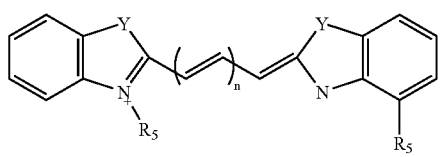

(XX)

wherein n is 0, 1, 2 or 3; R5 represents an alkyl group; and Y represents CH═CH, N—CH3, C(CH3)2, O, S or Se.

8. The recording medium of claim 1 wherein the infrared sensitive dyes comprise a compound having at least one of a lactone, lactam, sulfone, spiropyran, ester, and amide structure.

9. The recording medium of claim 8 wherein the infrared sensitive dyes are selected from the group consisting of triarylmethane compounds, bisphenyl methane compounds, xanthene compounds, fluoran compounds, thiazine compounds and spiropyran compounds.

10. The recording medium of claim 1 wherein the infrared sensitive dyes are yellow dyes selected from the group consisting of

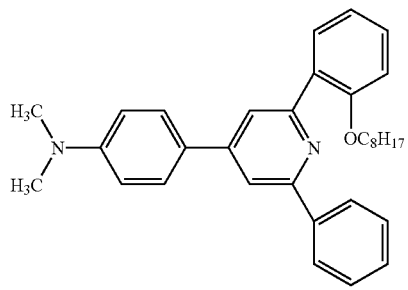

(XXI)

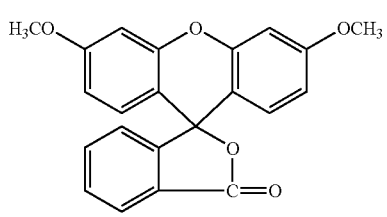

(XXII)

11. The recording medium of claim 1 wherein the infrared sensitive dyes are Magenta dyes selected from the group consisting of

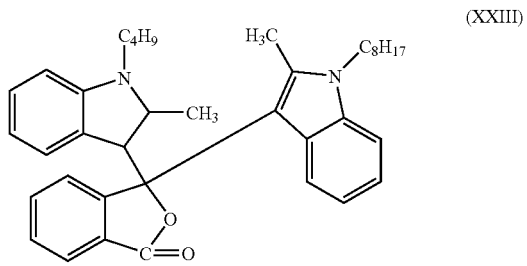

(XXIII)

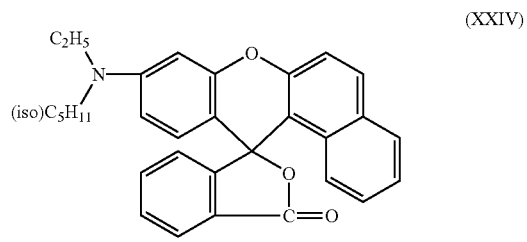

(XXIV)

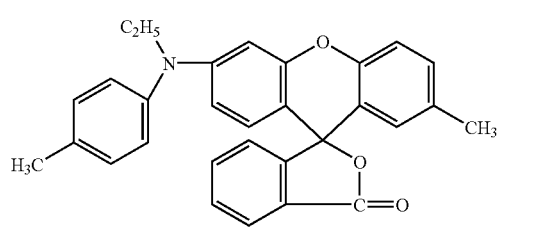

(XXV)

12. The recording medium of claim 1 wherein the infrared sensitive dyes are cyan dyes selected from the group consisting of

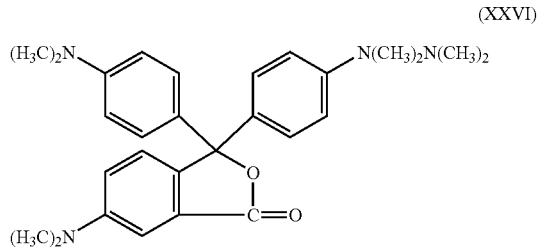

(XXVI)

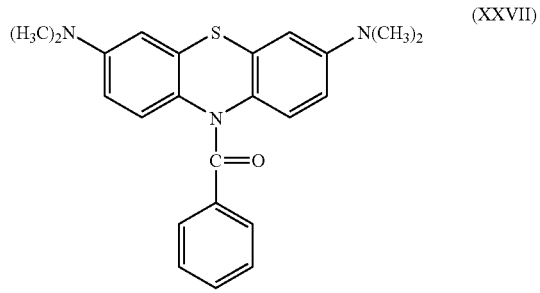

(XXVII)

13. The recording medium of claim 1 wherein the infrared sensitive dyes are selected from the group consisting of

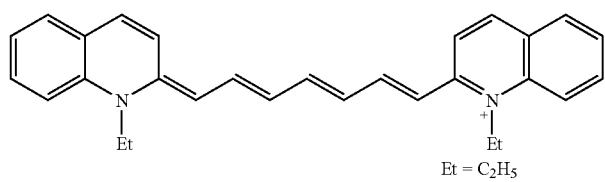
(XXVIII)
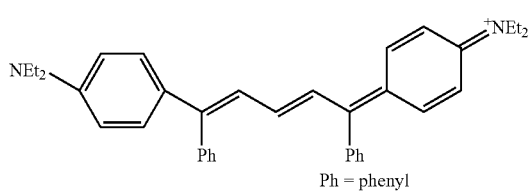
(XXIX)
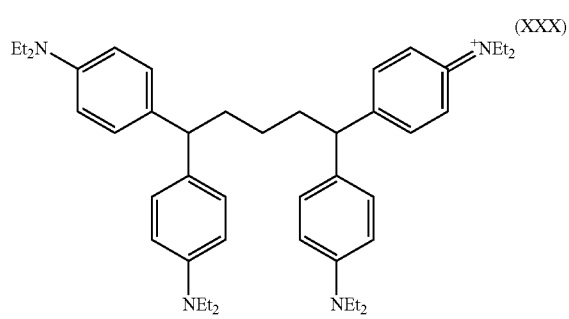
(XXX)
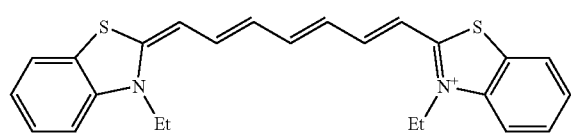
(XXXI)
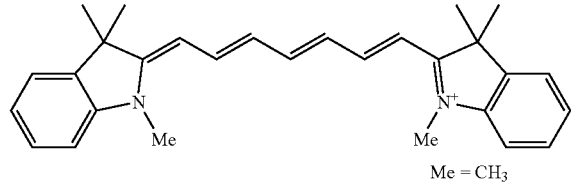
(XXXII)
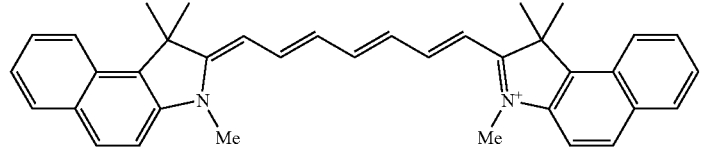
(XXXIII)
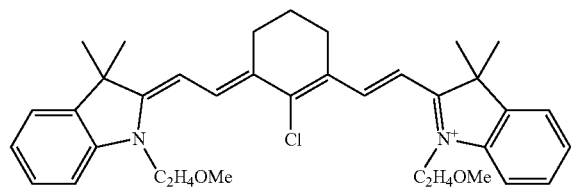
(XXXIV)
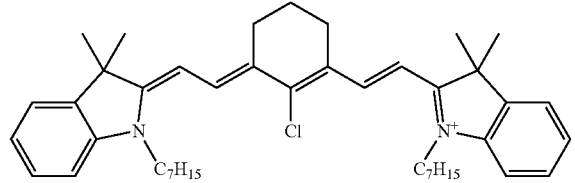
(XXXV)
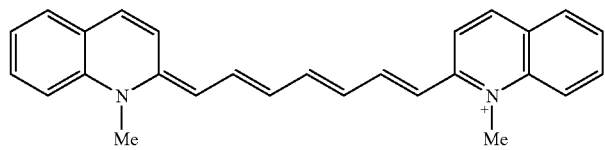
(XXXVI)

-continued
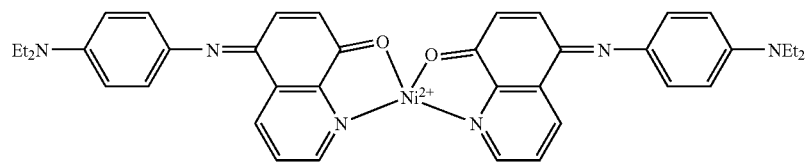
(XXXVII)
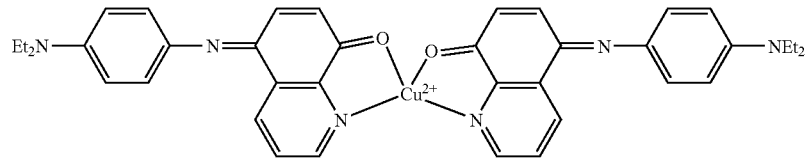
(XXXVIII)
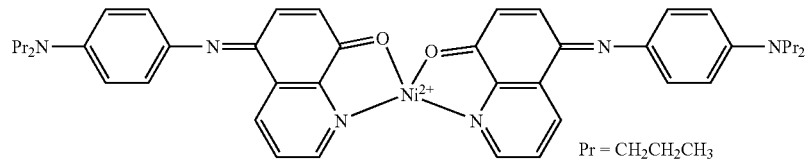
(XXXIX)
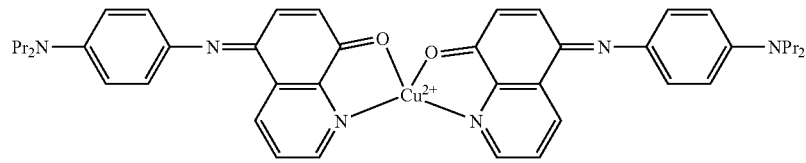
(XL)
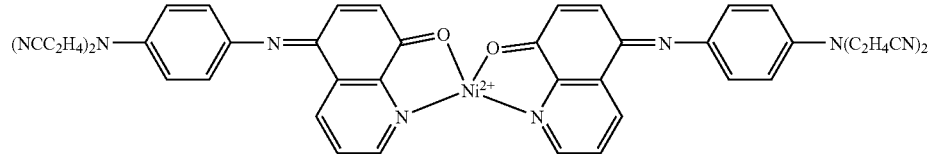
(XLI)
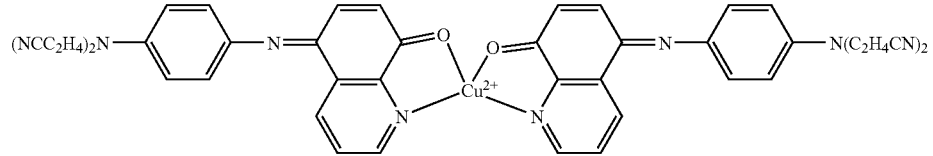
(XLII)
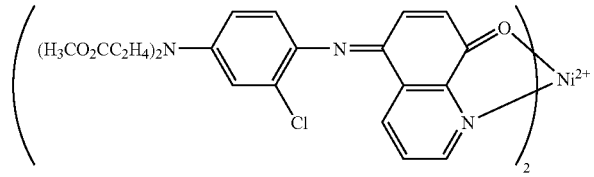
(XLIII)
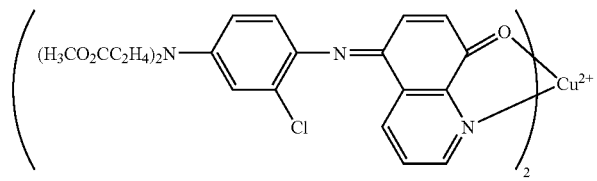
(XLIV)
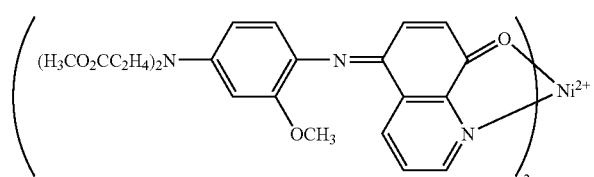
(XLV)

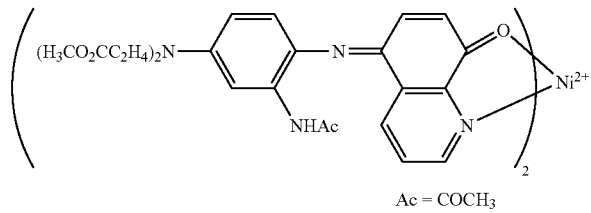
(XLVI)

Ac = COCH₃

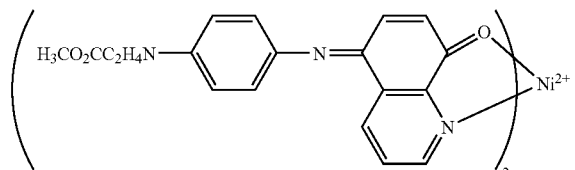
(XLVII)

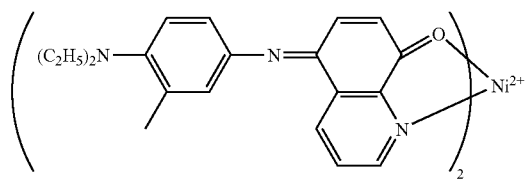
(XLVIII)

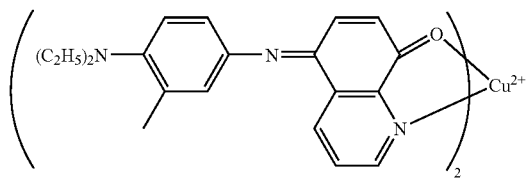
(XLIX)

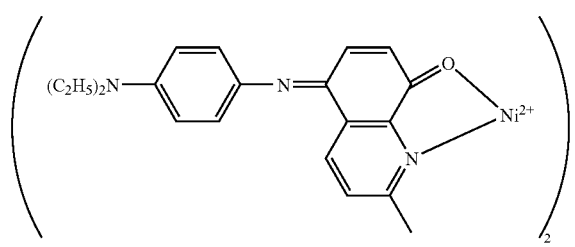
(L)

(LI)

(LII)

14. The recording medium of claim 13 wherein the leuco dyes are selected from the group consisting of aminotriarylmethanes, aminoxanthenes, and leucoindigoid dyes.

15. The recording medium according to claim 14, the leuco dyes being aminotriarylmethanes wherein two of the aryl groups are phenyl groups having an R1R2N-substituent in the position para to the bond to the methane carbon atom and wherein each of R1 and R2 are independently selected from hydrogen, C1–C10 alkyl, 2-hydroxyethyl, 2-cyanoethyl, and benzyl and wherein the third aryl group is selected from:
   a) phenyl which can be substituted with lower alkyl, lower alkoxy, chloro, diphenylamino, cyano, nitro, hydroxy, fluoro or bromo;
   b) naphthyl which can be substituted with amino, di-lower alkylamino, alkylamino;
   c) pyridyl which can be substituted with alkyl;
   d) quinolyl;
   e) indolinylidene which can be substituted with alkyl.

16. The recording medium according to claim 15, wherein R1 and R2 are selected from hydrogen and alkyl of 1–4 carbon atoms.

17. The recording medium according to claim 14 wherein the aminotriarylmethanes are selected from tris(N,N-dimethylaminophenyl)methane (LCV); deutero-tris(N,N-dimethylaminophenyl)methane (D-LCV); tris(N,N-diethylaminophenyl)methane(LECV); deutero-tris(4-diethylaminolphenyl)methane (D-LECV); tris(N, N-di-n-propylaminophenyl)methane (LPCV); tris(N,N-dinbutylaminophenyl)methane (LBCV); bis(4-diethylaminophenyl)-(4-diethylamino-2-methyl-phenyl)methane (LV-1); bis(4-diethylamino-2-methylphenyl)-(4-diethylamino-phenyl)methane (LV-2); tris(4-diethylamino-2-methylphenyl)methane (LV-3); deutero-bis(4-diethylaminophenyl)-(4-diethylamino-2-methylphenyl)methane (D-LV-1); deutero-bis(4-diethylamino-2-methylphenyl)(4-diethylaminophenyl)methane (D-LV-2); and bis(4-diethylamino-2-methylphenyl)(3,4-dimethoxyphenyl)methane (LB-8).

18. The recording medium of claim 17 wherein the aminotriarylmethane leuco dyes have alkyl substituents selected from C1–C4 alkyl, the substituents bonded to the amino moieties.

19. The recording medium of claim 18 wherein the aminotriaryl methane leuco dyes are further substituted with one or more alkyl groups on the aryl rings, the alkyl groups being independently selected from C1–C3 alkyl.

20. The recording medium of claim 18 wherein the aminotriarylmethane leuco dyes comprise at least one of chemical structures

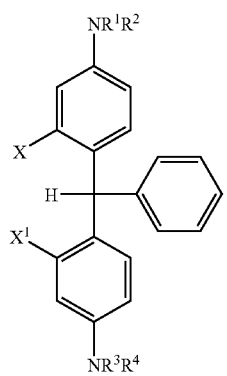

III

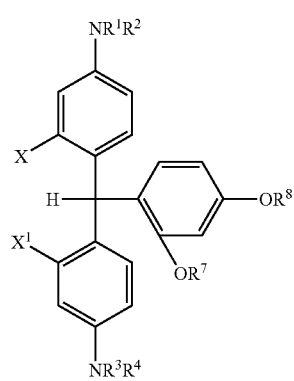

IV

III through VI:

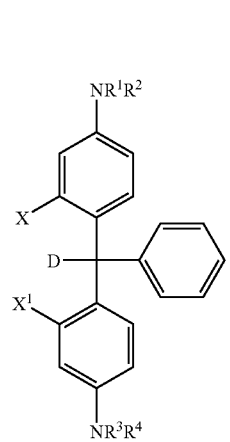

V

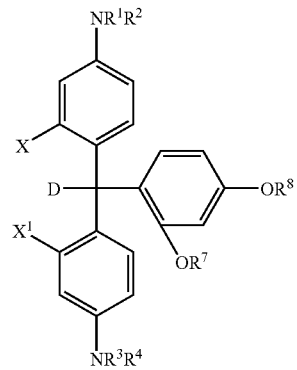

VI wherein III through VI have components X, X1, $X^2$ and R1 through R6 selected from a) through C):

a) X and $X^1$ are H; and $R^1$ through R4 are independently selected from H and C1–C8 alkyl b) X and $X^1$ are H and $R^1$ and $R^3$ are aryl; and $R^2$ and $R^4$ are H c) X=CH$_3$, $X^1$=H and $R^1$ through R4 are independently selected from H and C1–C8 alkyl; and R7 and R8 are independently selected from C1–C8 alkyl, or R7 and R8 are bridged to form a cyclic attachment with a CH$_2$— or C$_2$H4— bond, thereby forming a five- or six-membered ring, respectively.

21. The recording medium of claim 17 wherein the amino triarylmethane leuco dyes are selected from the group consisting of: D-LECV, LV-1, LV-2, D-LV-1, and D-LV-2.

22. The recording medium of claim 21 wherein at least one of the aminotriarylmethane leuco dyes is selected from LV-1 and LV-2.

23. The recording medium of claim 21 wherein at least one of the aminotriarylmethane leuco dyes is Trans-3-hydroxy-2-(p-diethylaminobenzyl)indanone (LY-1).

24. The recording medium of claim 21 wherein at least one of the aminotriarylmethane leuco dyes is Benzo((a)-6-N,N-diethylamino-9-(2-methoxycarbonyl)-phenylxanthene (LM-5).

25. The recording medium of claim 21 wherein the aminotriarylmethane leuco dyes comprise at least one of chemical structures

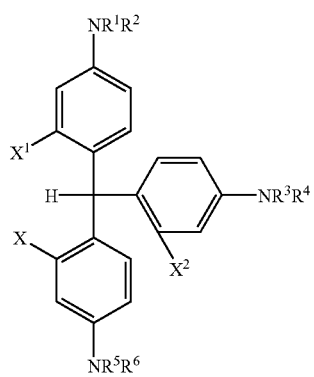

I

-continued

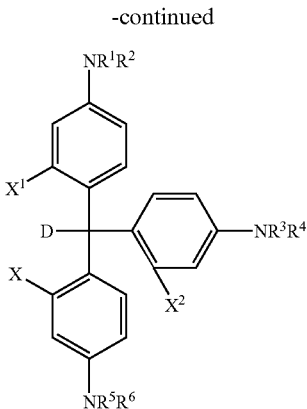

II

I and II: wherein I and II have components X, X₁, X₂ and R₁ through R₆ selected from a) through g):
a) X, X¹ and X² are H; R¹ through R⁶ are H;
b) X, X¹ and X² are H; R¹ through R⁶ are OH₃;
c) X, X¹ and X² are H; R¹ through R⁶ are C₂H₅;
d) X, X¹ and X² are H; R¹ through R⁶ are independently selected from H and C3–8 alkyl;
e) X and X¹ are H; X² is CH₃; R¹ through R⁶ are independently selected from H and C1–C8 alkyl;
f) X is H; X¹ and X² are CH₃; R¹ through R⁶ are independently selected from H and C1–C8 alkyl;
g) X, X¹ and X² are H; R¹, R³ and R⁵ are independently selected from aryl C6–C10; substituted C6–C10 aryl; and R2, R4, and R⁶ are H.

26. The recording medium of claim 21 wherein the aminotriarylmethaneleuco dyes comprise chemical structure VII:

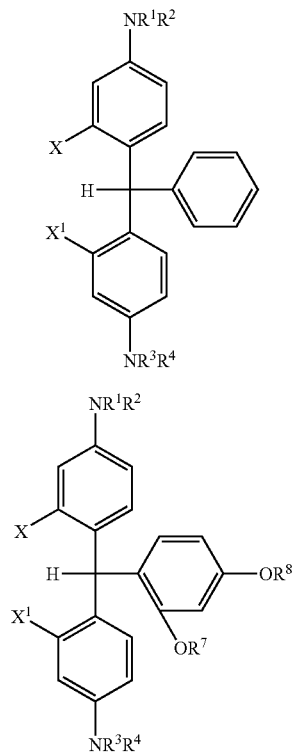

III

IV

-continued

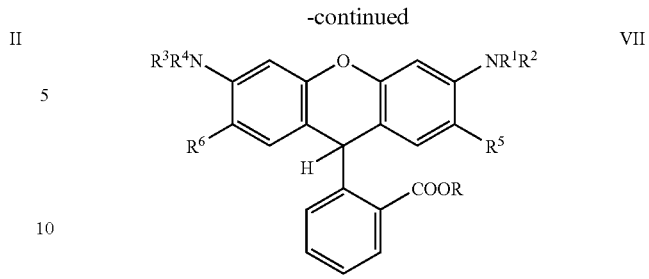

VII wherein R is independently selected from H, C1–C8 alkyl; R⁵ and R⁶ are independently selected from H and C1–C4 alkyl; R¹ through R4 are independently selected from H and C1–C6 alkyl, C6–C10 aryl with the proviso that, if R¹ and R³ are aryl, then R2 and R4 are hydrogen.

27. The recording medium of claim 14 wherein the leuco dyes comprise at feast one of aminotriarylmethanes and aminoxanthenes.

28. The recording medium of claim 1 wherein the infrared sensitive dyes are leuco dyes selected from the group consisting of:
aminotriarylmethanes; aminoxanthenes; aminothioxanthenes; amino-9,10-dihydroacridines; aminophenoxazines; aminophenothiazines; aminodihydrophenazines; aminodiphenylmethanes; leuco indamines; aminohydrocinnamic acids (cyanoethanes, leuco methines) and corresponding esters; hydrozines; leuco indigoid dyes; amino-2,3-dihydroanthraquinones; tetrahalo-p, p'-biphenols; 2(p-hydroxyphenyl)-4,5-diphenylimidazoles; phenethylanilines; indanones and combinations thereof.

29. The recording medium of claim 1 wherein the near IR-absorbing dyes comprising comprise at least one of
1) DF-1: 2-((2-((2-chloro-3-(((1,3-dihydro-1,3,3-trimethyl-2H-indol-2-ylidene)ethylidene)-1-cyclopenten-1-yl)ethenyl)-1,3,3-trimethyl-3H-indolium trifluoromethanesulfonate;
2) RD-1: Cyasorb® IR-165 Near IR Dye(absorption maximum at 1070 nm); and
3) SQS 4((((3-((((2,6-bis(1,10-dimethylethyl)-4H-thiopyrann-4-ylidene)methyl)-2-methyl)2-hydroxy-4-oxo-2-cyclobuten-1-ylidene)methyl-2,6-bis(1,1-dimethylethyl)thiopyrilium hydroxide, inner salt.

30. The recording medium of claim 29 wherein the near IR absorbing dyes comprise at least one of DF-1 and RD-1.

31. The recording medium of claim 30 wherein the near IR absorbing dyes comprise DF-1.

32. The recording medium of claim 1 wherein the near IR absorbing dyes comprise Heptamethine cyanine dyes having a chemical structure (VIII) as shown below:

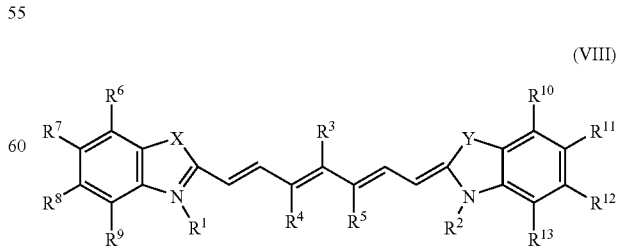

(VIII)

where R³ can be H, halogen, alkyl, aryl, aryl, alkoxy, aryloxy, thioalkyl, or thioaryl; R4 and R⁵ are independently selected from H, alkyl, aryl, or are bridged to form a cyclic attachment; each of $R^6$ through R13 is independently selected from H, alkyl, aryl, or any two adjacent R6 through R9 and any two adjacent R10 through R13 can form R10 through R13 can form a fused aryl; each of R1 and R2 are independently selected from alkyl, aryl and substituted alkyl; X and Y, which may or may not be identical, are each represented by the formula CR'R' where R', R" are independently selected from alkyl, aryl and substituted alkyl; X and Y, which may or may not be identical, are each represented by the formula CR'R" where R', R" are independently selected from H, C1–C6 alkyl, O, S, Se and Te.

33. The recording medium of claim 1 wherein the near IR absorbing dyes comprise Benzenaminium dyes having structure (IX) as shown below:

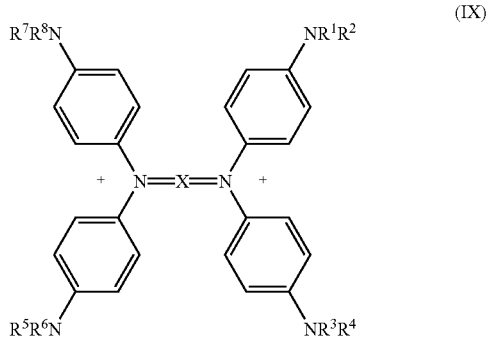

wherein each of $R^1$ through R8 is independently selected from C1–C6 alkyl; X is a substituted 1,4-cyclohexadiene.

34. The recording medium of claim 1 wherein the near IR-absorbing dyes have structure (X) or structure (XI) as shown below:

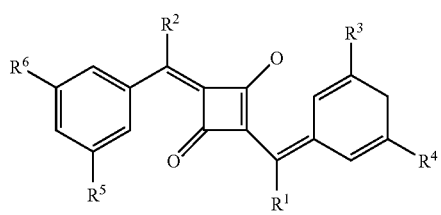

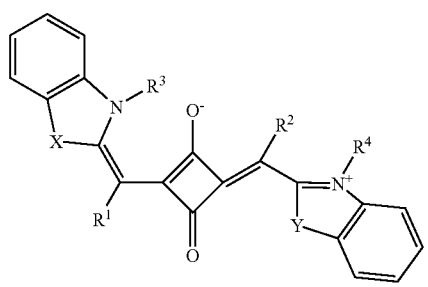

wherein each of R1 through R6 is independently selected from H, C1–C6 alkyl; X and Y are independently selected from O, S, Se, Te, N—R7, wherein R7 is selected from C1–C6 alkyl and wherein each of R1 and R2 is independently selected from H, C1–C6 alkyl; each of X and Y is independently selected from O, S, Se, Te, N—R7, wherein R7 is selected from C1–C6 alkyl; each R3 and R4 is independently selected from alkyl, aryl or substituted alkyl and wherein the benzene rings in structure (XI) may be further substituted.

35. The recording medium of claim 1 wherein the near IR-absorbing dyes are selected from the group consisting of:

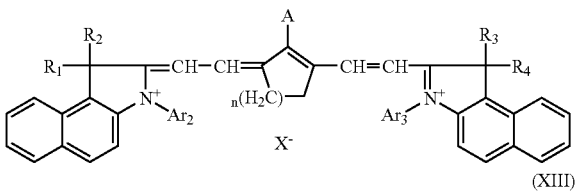

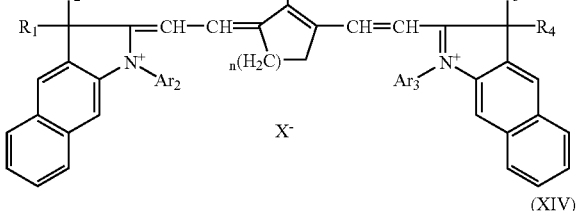

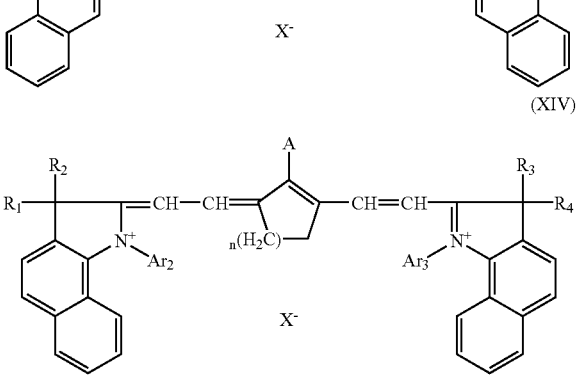

wherein R1–R4 are independently substituted or unsubstituted C1–C6 alkyl; A is substituted or unsubstituted phenyl, naphthyl, C1–C6 alkyl, or C7–C10 aralkyl; Ar2 and Ar3 are independently substituted or unsubstituted phenyl or naphthyl; X is a monovalent anion; and n is 1 or 2.

36. The recording medium of claim 35 wherein the alkyl, aryl or aralkyl substitution groups comprise at least one of: hydroxy, alkoxy, chloro, bromo, cyano, and amino.

37. The recording medium of claim 1 wherein the near IR-absorbing dyes are selected from the group consisting of: 2-((2((3-((((1,1-dimethyl-1,3-dihydro-3-phenyl-2H-benz ((e)indol-2-ylidene)ethylidene)-2-phenyl-1-cyclohexen-1-yl)ethenyl)-1,1-dimethyl-3-phenyl-1H-benz((e)indolium p-toluenesulfonate (JC-1); 2-((2((3-((((1,1-dimethyl-1,3-dihydro-3-phenyl-2H-benz((e)indol-2-ylidene)ethylidene)-2-phenyl-1-cyclopenten-1-yl)ethenyl)-1,1-dimethyl-3-phenyl-1H-benz((e)indolium p-toluenesulfonate (JC-2); 2-((2((3-((((1,1-dimethyl-1,3-dihydro-3-phenyl-2H-benz((f)indol-2-ylidene)ethylidene)-2-phenyl-1-cyclohexen-1-yl)ethenyl)-1,1-dimethyl-3-phenyl-1H-benz((f)indolium p-toluenesulfonate (JC-3); 2-((2((3-((((1,1-dimethyl-1,3-dihydro-3-phenyl-2H-benz((f)indol-2-ylidene)ethylidene)-2-phenyl-1-cyclopenten-1-yl)ethenyl)-1,1-dimethyl-3-phenyl-1H-benz((f)indolium p-toluenesulfonate (JC-4); 2-((2((3-((((1,1-dimethyl-1,3-dihydro-3-phenyl-2H-benz((g)indol-2-ylidene)ethylidene)-2-phenyl-1-cyclohexen-1-yl)ethenyl)-1,1-dimethyl-3-phenyl-1H-benz((g)indolium p-toluenesulfonate (JC-5); 2-((2((3-((((1,1-dimethyl-1,3-dihydro-3-phenyl-2H-benz((g)indol-2-ylidene)ethylidene)-2-phenyl-1-cyclopenten-1-yl)ethenyl)-1,1-dimethyl-3-phenyl-1H-benz((g)indolium p-toluenesulfonate (JC-6).

38. The recording medium of claim 37 wherein the near IR-absorbing dyes comprise at least one of JC-1 and JC-2.

39. The recording medium of claim 37 wherein the near IR-absorbing dyes comprise JC-1.

40. The recording medium of claim 1 wherein the infrared sensitive and near-IR absorbing dyes are encapsulated in microcapsules, the microcapsules comprising polymers having $T_g$ from 80° C. to 200° C.

41. The recording medium of claim 40 wherein the polymers are selected from the group consisting of polyurethanes, acrylates, styrenes and combinations thereof.

42. The recording medium of claim 40 wherein the polymers comprise styrene-butylacrylate-polyethylene glycol acrylate.

43. A method of making a CD/DVD recording medium comprising the step of applying on at least one surface of the recording medium laser sensitive materials comprising infrared sensitive dyes and near IR absorbing dyes;
wherein the at least one surface comprises at least one image recording area is having at least one labeling surface, the at least one labeling surface comprising laser sensitive materials;
and wherein the laser sensitive materials are for labeling the at least one surface of the recording medium and not for primary data storage.

44. The method of claim 43 wherein the infrared sensitive dyes comprise 3'phenyl-7-diethylamino-2,2'-spirodi-(2H-1-benzopyran); IR 10000 FBK; IR 10000 FBE; IR 10000 GBK; and IR 10000 GBE.

45. The method of claim 43 wherein the infrared sensitive dyes comprise colorless electron donating type dye precursor compounds which react with a developer compound to generate a dye.

46. The method of claim 45 wherein the colorless electron donating type dye precursor compound has at least one of a lactone, a lactam, a sulfone, a spiropyran, an ester or an amido structure.

47. The method of claim 45 wherein the colorless electron donating type dye precursor compound is selected from the group consisting of triarylmethane compounds, bisphenylmethane compounds, xanthene compounds, xanthene compounds, thiazine compounds, spiropyran compounds and the like.

48. The method of claim 47 wherein the colorless electron donating type dye precursor compound is selected from the group consisting of Crystal Violet lactone, benzoyl leuco methylene blue, Malachite Green Lactone, p-nitrobenzoyl leuco methylene blue, 3-dialkylamino-7-dialkylamino-fluoran, 3-methyl-2,2'-spirobi(benzo-f-chrome), 3,3-bis(p-dimethylaminophenyl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis(1,2-dimethylindole-3-yl-5-dimethylaminophthalide, 3,3-bis-(1,2-dimethylindole-3-yl)6-dimethylaminophthalide, 3,3-bis-(9-ethylcarbazole-3-yl)-5-dimethylaminophthalide, 3,3-bis(2-phenylindole-3-yl)-5-dimethylaminophthalide, 3-p-dimethylaminophenyl-3-(1-methyl pyrrole-2-yl)-6-dimethylaminophthalide, 4,4'-bis-dimethylaminobenzhydrin benzyl ether, N-halophenyl leuco Auramine, N-2,4,5-trichlorophenyl leuco Auramine, Rhodamine-B-anilinolactam, Rhodamine-(p-nitroanilino)lactam, Rhodamine-B-(p-chloroanilino)lactam, 3-dimethylamino-y-methoxyfluoran, 3-diethylamino-7-methoxyfluoran, 3-diethylamino-7-(acetylmethylamino)fluoran, 3-diethylamino-7-(dibenzylamino)fluoran, 3-diethylamino-7-(methylbenzylamino)fluoran, 3-diethylamino-7-(chloroethylmethylamino)fluoran, 3-diethylamino-7-(diethylamino)fluoran, 3-methyl-spiro-dinaphthopyran, 3,3'-dichloro-spiro-dinaphthopyran, 3-benzyl-spiro-dinaphthopyran, 3-methyl-naphtho-(3-methoxybenzo)-spiropyran, 3-propyl-spirodibenzoidipyran, and combinations thereof.

49. The method of claim 43 wherein the infrared sensitive dyes are cyanine dyes represented by the following formula (XX);

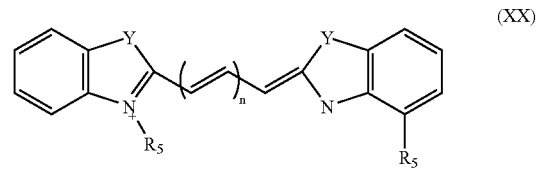

(XX)

wherein n is 0, 1, 2 or 3; R5 represents an alkyl group; and Y represents CH=CH, N—CH3, C(CH3)2, O, S or Se.

50. The method of claim 43 wherein the infrared sensitive dyes comprise a compound having at least one of a lactone, lactam, sulfone, spiropyran, ester, and amide structure.

51. The method of claim 50 wherein the infrared sensitive dyes are selected from the group consisting of triarylmethane compounds, bisphenyl methane compounds, xanthene compounds, fluoran compounds, thiazine compounds and spiropyran compounds.

52. The method of claim 43 wherein the infrared sensitive dyes are yellow dyes selected from the group consisting of.

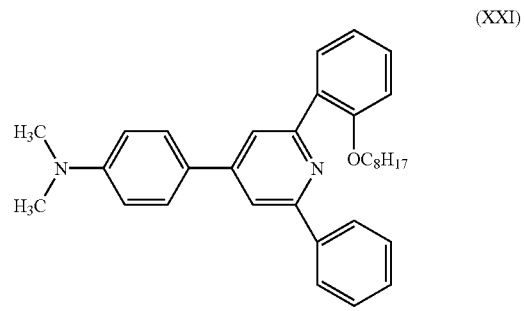

(XXI)

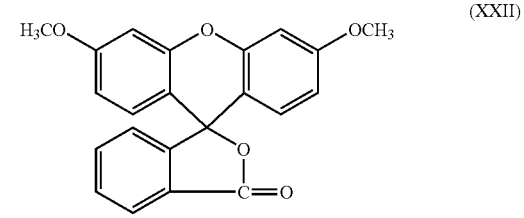

(XXII)

53. The method of claim 43 wherein the infrared sensitive dyes are Magenta dyes selected from the group consisting of

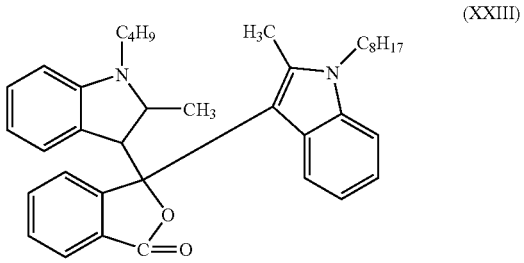

(XXIII)

-continued
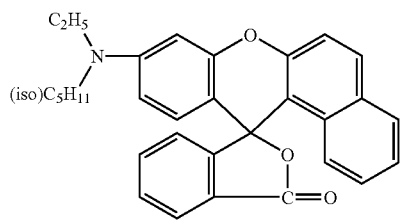
(XXIV)
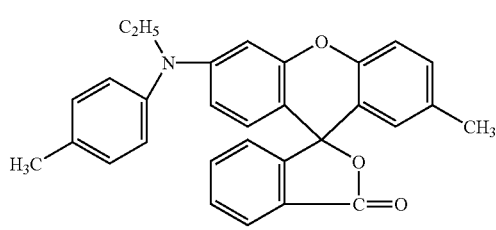
(XXV)
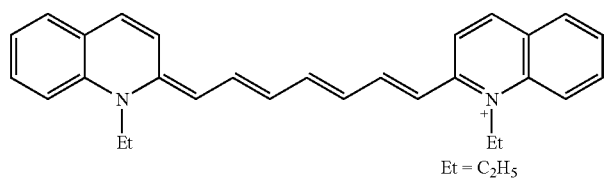
(XXVIII)
Et = C₂H₅
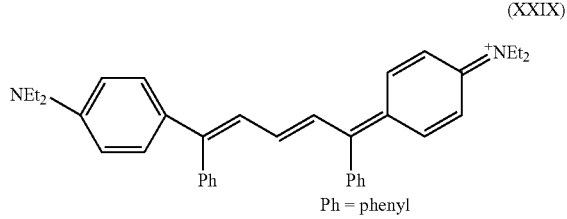
(XXIX)
Ph = phenyl
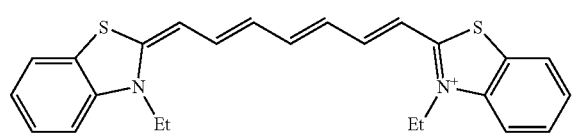
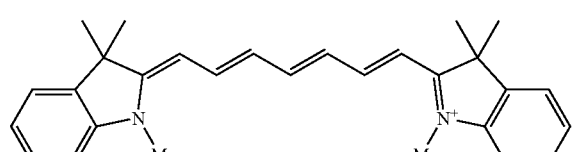
Me = CH₃
54. The method of claim 43 wherein the infrared sensitive dyes are cyan dyes selected from the group consisting of
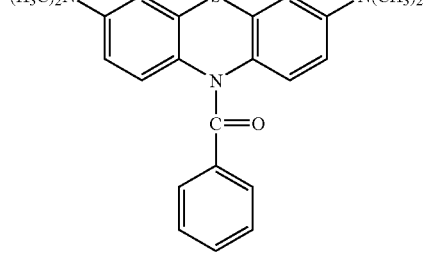
(XXVI)
(XXVII)
55. The method of claim 43 wherein the infrared sensitive dyes are selected from the group consisting of
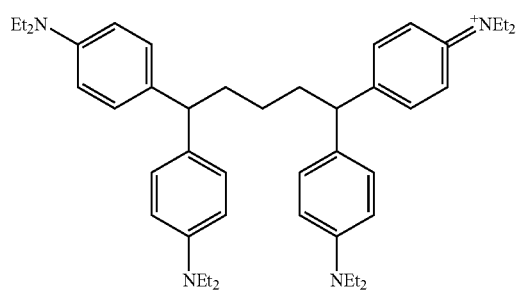
(XXX)
(XXXI)
(XXXII)

-continued
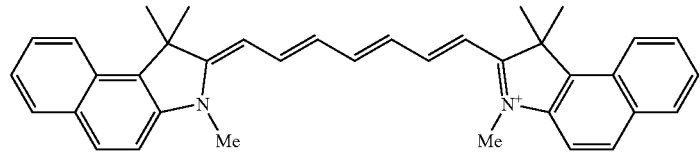
(XXXIII)
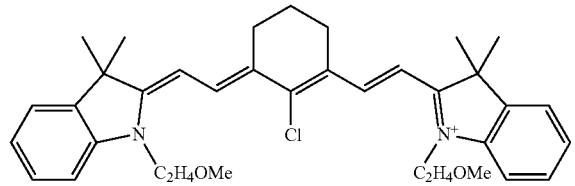
(XXXIV)
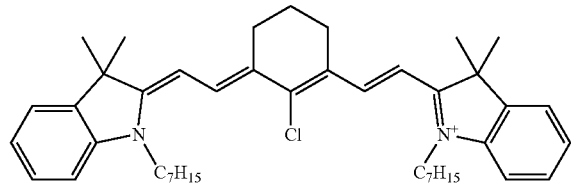
(XXXV)
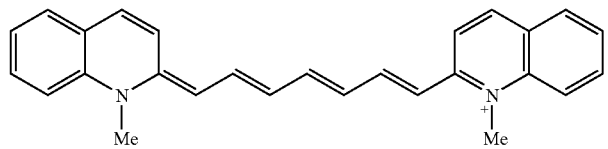
(XXXVI)
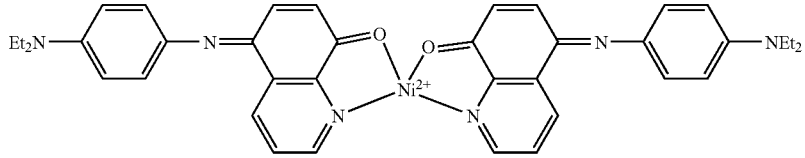
(XXXVII)
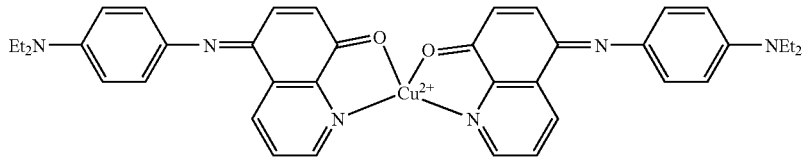
(XXXVIII)
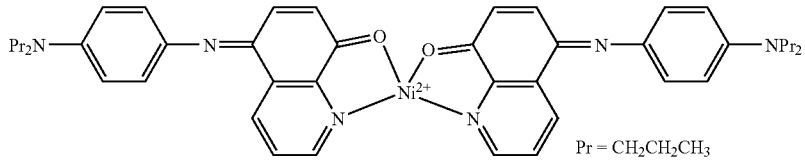
(XXXIX)
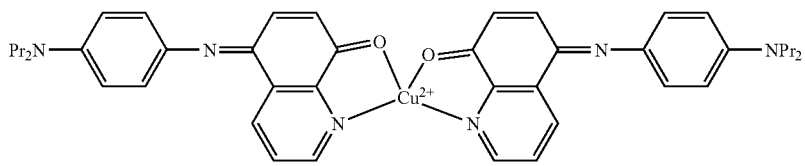
(XL)
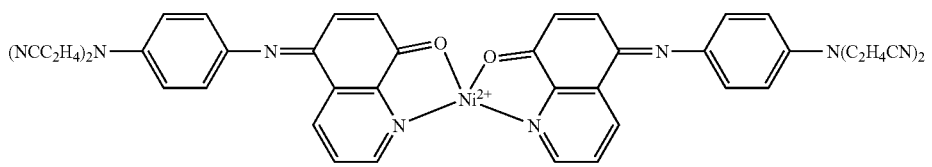
(XLI)

-continued
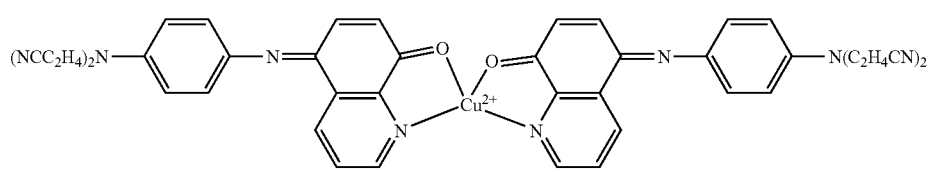
(XLII)
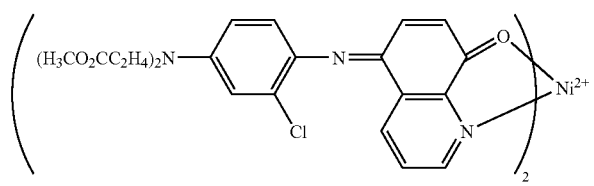
(XLIII)
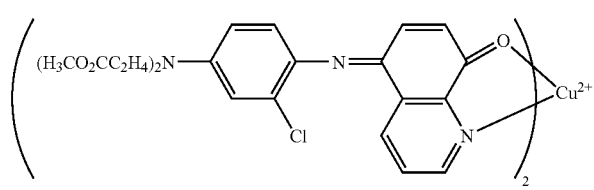
(XLIV)
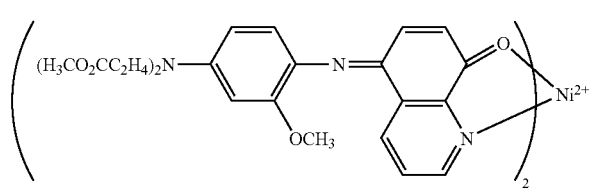
(XLV)
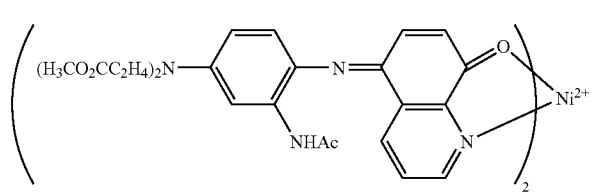
(XLVI)
Ac = COCH₃
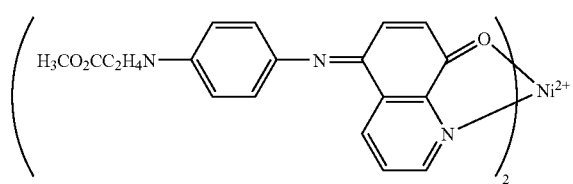
(XLVII)
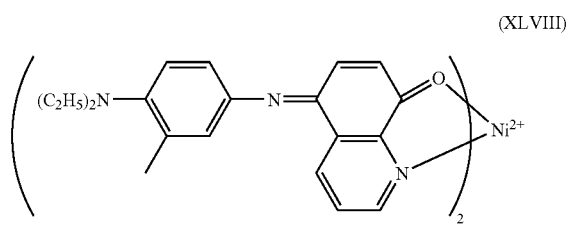
(XLVIII)
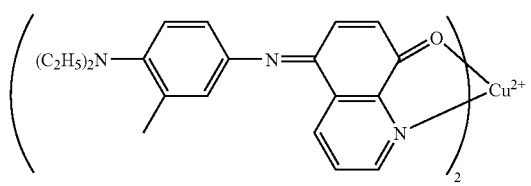
(XLIX)

-continued

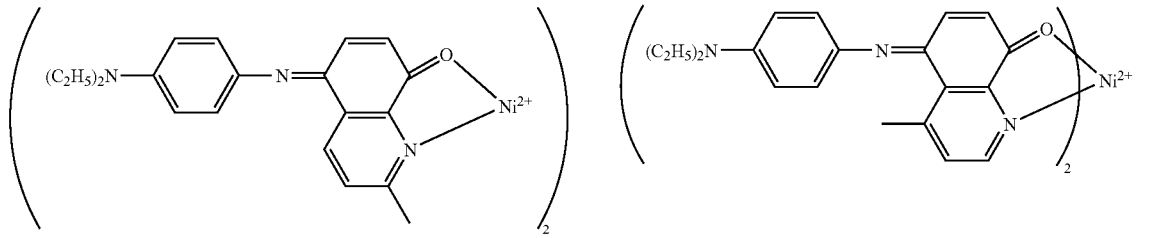

(L)

(LI)

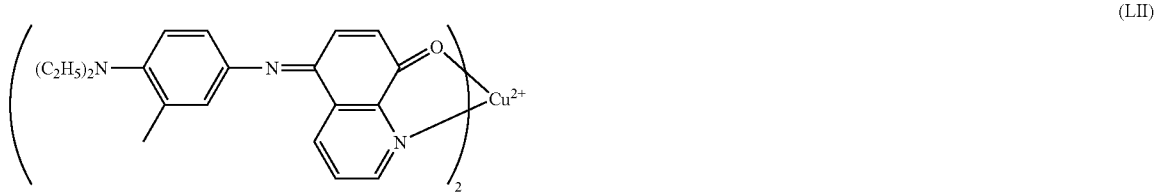

(LII)

56. The method of claim 55 wherein the leuco dyes are selected from the group consisting of aminotriarylmethanes, aminoxanthenes, and leucoindigoid dyes.

57. The method according to claim 56, the leuco dyes being aminotriarylmethanes wherein two of the aryl groups are phenyl groups having an R1R2N-substituent in the position para to the bond to the methane carbon atom and wherein each of R1 and R2 are independently selected from hydrogen, C1–C10 alkyl, 2-hydroxyethyl, 2-cyanoethyl, and benzyl and wherein the third aryl group is selected from:
   a) phenyl which can be substituted with lower alkyl, lower alkoxy, chloro, diphenylamino, cyano, nitro, hydroxy, fluoro or bromo;
   b) naphthyl which can be substituted with amino, di-lower alkylamino, alkylamino;
   c) pyridyl which can be substituted with alkyl;
   d) quinolyl;
   e) indolinylidene which can be substituted with alkyl.

58. The method according to claim 57, wherein R1 and R2 are selected from hydrogen and alkyl of 1–4 carbon atoms.

59. The method according to claim 56 wherein the aminotriarylmethanes are selected from tris(N,N-dimethylaminophenyl)methane (LCV); deutero-tris(N,N-dimethylaminophenyl)methane (D-LCV); tris(N,N-diethylaminophenyl) methane(LECV); deutero-tris(4-diethylaminolphenyl) methane (D-LECV); tris(N,N-di-n-propylaminophenyl) methane (LPCV); tris(N,N-din-butylaminophenyl)methane (LBCV); bis(4-diethylaminophenyl)-(4-diethylamino-2-methyl-phenyl)methane (LV-1); bis(4-diethylamino-2-methylphenyl)-(4-diethylamino-phenyl)methane (LV-2); tris(4-diethylamino-2-methylphenyl)methane (LV-3); deutero-bis (4-diethylaminophenyl)-(4-diethylamino-2-methylphenyl) methane (D-LV-1); deutero-bis(4-diethylamino-2-methylphenyl)(4-diethylaminophenyl)methane (D-LV-2); and bis(4-diethylamino-2-methylphenyl)(3,4-dimethoxyphenyl)methane (LB-8).

60. The method of claim 59 wherein the aminotriarylmethane leuco dyes have alkyl substituents selected from C1–C4 alkyl, the substituents bonded to the amino moieties.

61. The method of claim 60 wherein the aminotriaryl methane leuco dyes are further substituted with one or more alkyl groups on the aryl rings, the alkyl groups being independently selected from C1–C3 alkyl.

62. The method of claim 60 wherein the aminotriarylmethane leuco dyes comprise at least one of chemical structures III through VI:

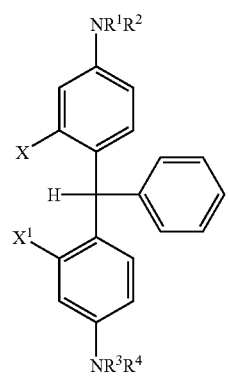

III

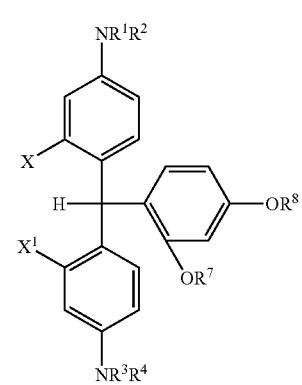

IV

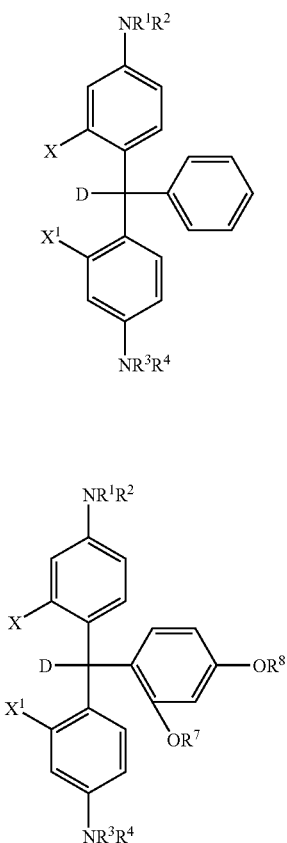

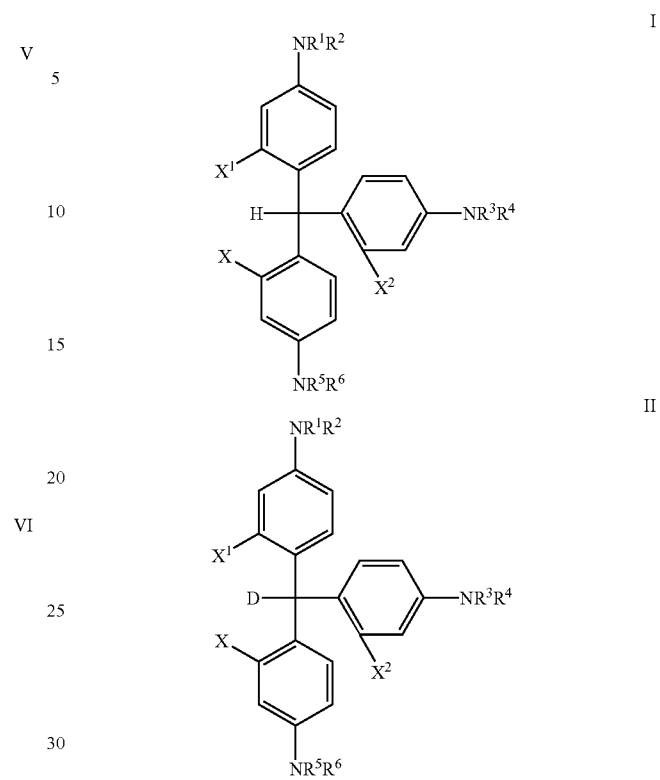

wherein III through VI have components X, X1, X2 and R1 through $R^6$ selected from a) through C):

a) X and $X^1$ are H; and $R^1$ through $R^4$ are independently selected from H and C1–C8 alkyl b) X and $X^1$ are H and $R^1$ and $R^3$ are aryl; and $R^2$ and $R^4$ are H c) X=CH$_3$, $X^1$=H and $R^1$ through $R^4$ are independently selected from H and C1–C8 alkyl; and $R^7$ and $R^8$ are independently selected from C1–C10 alkyl, or $R^7$ and $R^8$ are bridged to form a cyclic attachment with a CH2— or C$_2$H$_4$— bond, thereby forming a five- or six-membered ring, respectively.

63. The method of claim 59 wherein the amino triarylmethane leuco dyes are selected from the group consisting of: D-LECV, LV-1, LV-2, D-LV-1, and D-LV-2.

64. The method of claim 63 wherein at least one of the aminotriarylmethane leuco dyes is selected from LV-1 and LV-2.

65. The method of claim 63 wherein at least one of the aminotriarylmethane leuco dyes is Trans-3-hydroxy-2-(p-diethylaminobenzyl)indanone (LY-1).

66. The method of claim 63 wherein at least one of the aminotriarylmethane leuco dyes is Benzo((a)-6-N,N-diethylamino-9-(2-methoxycarbonyl)-phenylxanthene (LM-5).

67. The method of claim 63 wherein the aminotriarylmethane leuco dyes comprise at least one of chemical structures I and II:

wherein I and II have components X, $X_1$, $X_2$ and $R_1$ through $R_6$ selected from a) through g):

a) X, $X^1$ and $X^2$ are H; $R^1$ through $R^6$ are H;
b) X, $X^1$ and $X^2$ are H; $R^1$ through $R^6$ are OH$_3$;
c) X, $X^1$ and $X^2$ are H; $R^1$ through $R^6$ are C$_2$H$_5$;
d) X, $X^1$ and $X^2$ are H; $R^1$ through $R^6$ are independently selected from H and C3–8 alkyl;
e) X and $X^1$ are H; $X^2$ is CH$_3$; $R^1$ through $R^6$ are independently selected from H and C1–C8 alkyl;
f) X is H; $X^1$ and $X^2$ are CH$_3$; $R^1$ through $R^6$ are independently selected from H and C1–C8 alkyl;
g) X, $X^1$ and $X^2$ are H; $R^1$, $R^3$ and $R^5$ are independently selected from aryl C6–C10; substituted C6–C10 aryl; and $R^2$, $R^4$, and $R^6$ are H.

68. The method of claim 63 wherein the aminotriarylmethaneleuco dyes comprise chemical structure VII:

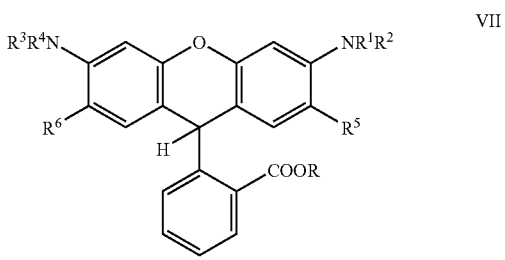

wherein R is independently selected from H, C1–C8 alkyl; $R^5$ and $R^6$ are independently selected from H and C1–C4 alkyl; $R^1$ through $R^4$ are independently selected from H and C1–C6 alkyl, C6–C10 aryl with the proviso that, if $R^1$ and $R^3$ are aryl, then $R^2$ and $R^4$ are hydrogen.

69. The method of claim 56 wherein the leuco dyes comprise at least one of aminotriarylmethanes and aminoxanthenes.

70. The method of claim 43 wherein the infrared sensitive dyes are leuco dyes selected from the group consisting of: aminotriarylmethanes; aminoxanthenes; aminothioxanthenes; amino-9, 10-dihydroacridines; aminophenoxazines; aminophenothiazines; aminodihydrophenazines; aminodiphenylmethanes; leuco indamines; aminohydrocinnamic acids (cyanoethanes, leuco methines) and corresponding esters; hydrozines; leuco indigoid dyes; amino-2,3-dihydroanthraquinones; tetrahalo-p,p'-biphenols; 2(p-hydroxyphenyl)-4,5-diphenylimidazoles; phenethylanilines; indanones and combinations thereof.

71. The method of claim 43 wherein the near IR-absorbing dyes comprise at least one of
1) DF-1: 2-((2-((2-chloro-3-(((1,3-dihydro-1,3,3-trimethyl-2H-indol-2-ylidene)ethylidene)-1-cyclopenten-1-yl)ethenyl)-1,3,3-trimethyl-3H-indolium trifluoromethanesulfonate;
2) RD-1: Cyasorb® IR-165 Near IR Dye(absorption maximum at 1070 nm); and 3) SQS 4((((3-((((2,6-bis(1,10-dimethylethyl)-4H-thiopyrann-4-ylidene)methyl)-2-methyl)2-hydroxy-4-oxo-2-cyclobuten-1-ylidene)methyl-2,6-bis(1,1-dimethylethyl)thiopyrilium hydroxide, inner salt.

72. The method of claim 71 wherein the near IR absorbing dyes comprise at least one of DF-1 and RD-1.

73. The method of claim 72 wherein the near IR absorbing dyes comprise DF-1.

74. The method of claim 43 wherein the near IR absorbing dyes comprise Heptamethine cyanine dyes having a chemical structure (VIII) as shown below:

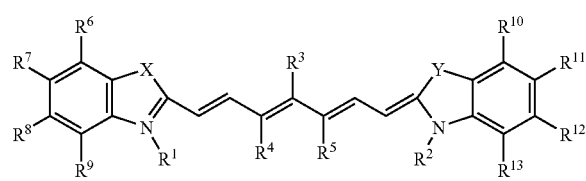

(VIII)

where R3 can be H, halogen, alkyl, aryl, aryl, alkoxy, aryloxy, thioalkyl, or thioaryl; R4 and R5 are independently selected from H, alkyl, aryl, or are bridged to form a cyclic attachment; each of R6 through R13 is independently selected from H, alkyl, aryl, or any two adjacent R6 through R9 and any two adjacent R10 through R13 can form R10 through R13 can form a fused aryl; each of R1 and R2 are independently selected from alkyl, aryl and substituted alkyl; X and Y, which may or may not be identical, are each represented by the formula CR'R', where R'R" are independently selected from alkyl, aryl and substituted alkyl; X and Y, which may or may not be identical, are each represented by the formula CR'R" where R', R" are independently selected from H, C1–C6 alkyl, O, S, Se and Te.

75. The method of claim 43 wherein the near IR absorbing dyes comprise Benzenaminium dyes having structure (IX) as shown below:

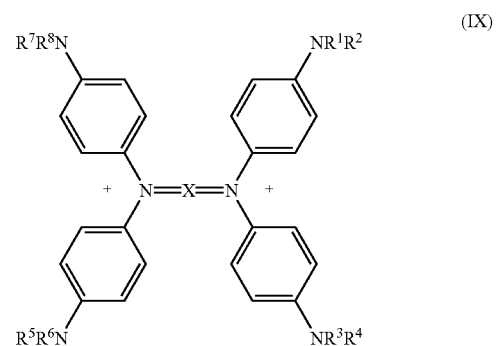

(IX)

wherein each of $R^1$ through $R^8$ is independently selected from C1–C6 alkyl; X is a substituted 1,4-cyclohexadiene.

76. The method of claim 43 wherein the near IR-absorbing dyes have structure (X) or structure (XI) as shown below:

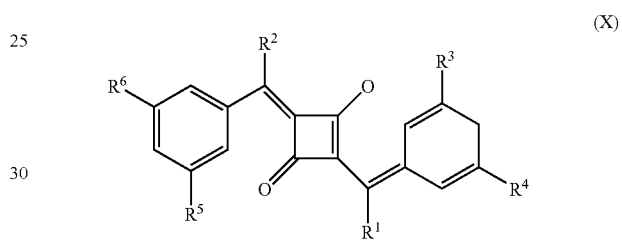

(X)

wherein each of R1 through R6 is independently selected from H, C1–C6 alkyl; X and Y are independently selected from O, S, Se, Te, N—R7, wherein R7 is selected from C1–C6 alkyl and wherein each of R1 and R2 is independently selected from H, C1–C6 alkyl; each of X and Y is independently selected from O, S, Se, Te, N—R7, wherein R7 is selected from C1–C6 alkyl; each R3 and R4 is independently selected from alkyl, aryl or substituted alkyl and wherein the benzene rings in structure (XI) may be further substituted.

77. The method of claim 43 wherein the near IR-absorbing dyes are selected from the group consisting of:

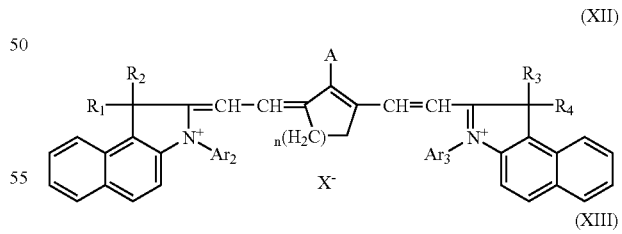

(XII)

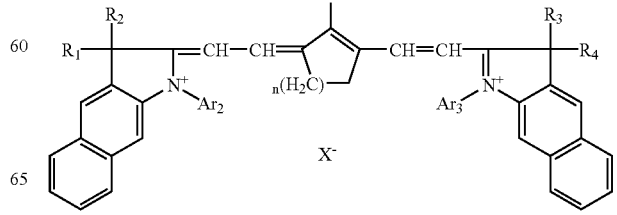

(XIII)

-continued

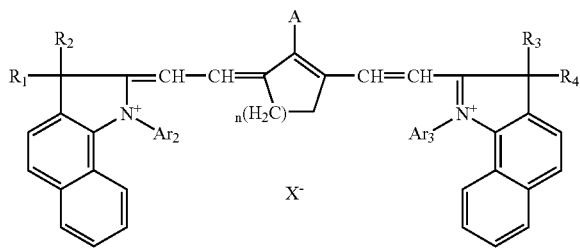

(XIV)

wherein R1–R4 are independently substituted or unsubstituted C1–C6 alkyl; A is substituted or unsubstituted phenyl, naphthyl, C1–C6 alkyl, or C7–C10 aralkyl; Ar2 and Ar3 are independently substituted or unsubstituted phenyl or naphthyl; X is a monovalent anion; and n is 1 or 2.

78. The method of claim 77 wherein the alkyl, aryl or aralkyl substitution groups comprise at least one of: hydroxy, alkoxy, chloro, bromo, cyano, and amino.

79. The method of claim 43 wherein the near IR-absorbing dyes are selected from the group consisting of: 2-((2((3-((((1,1-dimethyl-1,3-dihydro-3-phenyl-2H-benz((e)indol-2-ylidene)ethylidene)-2-phenyl-1-cyclohexen-1-yl)ethenyl)-1,1-dimethyl-3-phenyl-1H-benz((e)indolium p-toluenesulfonate (JC-1); 2-((2((3-((((1,1-dimethyl-1,3-dihydro-3-phenyl-2H-benz((e)indol-2-ylidene)ethylidene)-2-phenyl-1-cyclopenten-1-yl)ethenyl)-1,1-dimethyl-3-phenyl-1H-benz((e)indolium p-toluenesulfonate (JC-2); 2-((2((3-((((1,1-dimethyl-1,3-dihydro-3-phenyl-2H-benz((f)indol-2-ylidene)ethylidene)-2-phenyl-1-cyclohexen-1-yl)ethenyl)-1,1-dimethyl-3-phenyl-1H-benz((f)indolium p-toluenesulfonate (JC-3); 2-((2((3-((((1,1-dimethyl-1,3-dihydro-3-phenyl-2H-benz((f)indol-2-ylidene)ethylidene)-2-phenyl-1-cyclopenten-1-yl)ethenyl)-1,1-dimethyl-3-phenyl-1H-benz((f)indolium p-toluenesulfonate (JC-4); 2-((2((3-((((1,1-dimethyl-1,3-dihydro-3-phenyl-2H-benz((g)indol-2-ylidene)ethylidene)-2-phenyl-1-cyclohexen-1-yl)ethenyl)-1,1-dimethyl-3-phenyl-1H-benz((g)indolium p-toluenesulfonate (JC-5); 2-((2((3-((((1,1-dimethyl-1,3-dihydro-3-phenyl-2H-benz((g)indol-2-ylidene)ethylidene)-2-phenyl-1-cyclopenten-1-yl)ethenyl)-1,1-dimethyl-3-phenyl-1H-benz((g)indolium p-toluenesulfonate (JC-6).

80. The method of claim 79 wherein the near IR-absorbing dyes comprise at least one of JC-1 and JC-2.

81. The method of claim 79 wherein the near IR-absorbing dyes comprise JC-1.

82. The method of claim 43 wherein the infrared sensitive and near-IR absorbing dyes are encapsulated in microcapsules, the microcapsules comprising polymers having $T_g$ from 80° C. to 200° C.

83. The method of claim 82 wherein the polymers are selected from the group consisting of polyurethanes, acrylates, styrenes and combinations thereof.

84. The method of claim 82 wherein the polymers comprise styrene-butylacrylate-polyethylene glycol acrylate.

* * * * *

UNITED STATES PATENT AND TRADEMARK OFFICE
CERTIFICATE OF CORRECTION

| | | |
|---|---|---|
| PATENT NO. | : 7,172,991 B2 | |
| APPLICATION NO. | : 09/976877 | |
| DATED | : February 6, 2007 | |
| INVENTOR(S) | : Anderson et al. | |

It is certified that error appears in the above-identified patent and that said Letters Patent is hereby corrected as shown below:

Col. 5 (line 34), delete "R1 and R2" and insert therefor --$R^1$ and $R^2$--.

Col. 8 (line 62), delete "R3" and insert therefor --$R^3$--.

Col. 8 (line 62), delete "aryl, aryl," and insert therefor --aryl,--.

Col. 8 (line 63), delete "R4 and R5" and insert therefor --$R^4$ and $R^5$--.

Col. 8 (line 65), delete "R6 through R13" and insert therefor --$R^6$ through $R^{13}$--.

Col. 8 (line 66), delete "alkyl aryl," and insert therefor --alkyl, aryl,--.

Col. 8 (line 66), delete "R6" and insert therefor --$R^6$--.

Col. 8 (line 67), delete "R9" and insert therefor --$R^9$--.

Col. 8 (line 67), delete "R10 through R13" and insert therefor --$R^{10}$ through $R^{13}$--.

Col. 8 (line 67), delete "R10" and insert therefor --$R^{10}$--.

Col. 9 (line 1), delete "R13" and insert therefor --$R^{13}$--.

Col. 9 (line 1), delete "R1 and R2" and insert therefor --$R^1$ and $R^2$--.

Col. 9 (line 4), delete "CR'R'" and insert therefor --CR'R"--.

Col. 9 (line 48), delete "R1 through R6" and insert therefor --$R^1$ through $R^6$--.

Col. 9 (line 50), delete "N-R7, wherein R7" and insert therefor --N-$R^7$, wherein $R^7$--.

Col. 9 (line 66), delete "R1 and R2" and insert therefor --$R^1$ and $R^2$--.

Col. 10 (line 1), delete "N-R7, wherein R7" and insert therefor --N-$R^7$, wherein $R^7$--.

Col. 10 (line 2), delete "R3 and R4" and insert therefor --$R^3$ and $R^4$--.

UNITED STATES PATENT AND TRADEMARK OFFICE
CERTIFICATE OF CORRECTION

PATENT NO. : 7,172,991 B2
APPLICATION NO. : 09/976877
DATED : February 6, 2007
INVENTOR(S) : Anderson et al.

It is certified that error appears in the above-identified patent and that said Letters Patent is hereby corrected as shown below:

Col. 10, Structures (XII), (XIII), and (XIV): delete the entire structures (XII), (XIII), and (XIV) and replace them with the following structures (XII), (XIII), and (XIV):

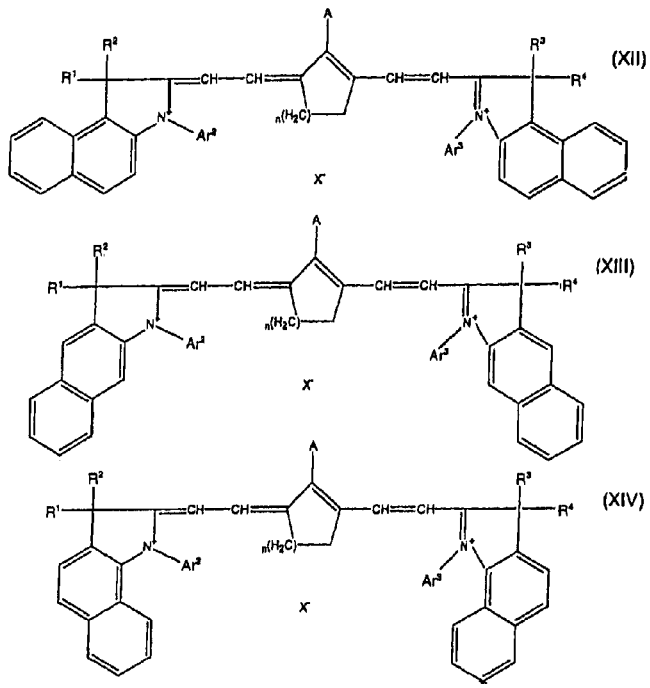

Col. 10 (line 45), delete "R1-R4" and insert therefor --$R^1$-$R^4$--.

Col. 10 (line 47), delete "Ar2 and Ar3" and insert therefor --$Ar^2$ and $Ar^3$--.

Col. 12, Formula (XX): delete the entire formula (XX) and replace it with the following formula (XX):

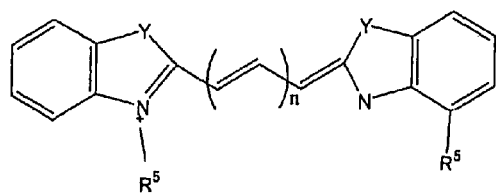

UNITED STATES PATENT AND TRADEMARK OFFICE
CERTIFICATE OF CORRECTION

PATENT NO. : 7,172,991 B2
APPLICATION NO. : 09/976877
DATED : February 6, 2007
INVENTOR(S) : Anderson et al.

It is certified that error appears in the above-identified patent and that said Letters Patent is hereby corrected as shown below:

Col. 12 (line 66), delete "R5" and insert therefor --$R^5$--.

Col. 12 (line 67), delete "N-CH3, C(CH3)2," and insert therefor --N-CH$_3$, C(CH$_3$)$_2$,--.

Col. 19, Structure (L): delete the entire structure (L) and replace it with the following structure (L):

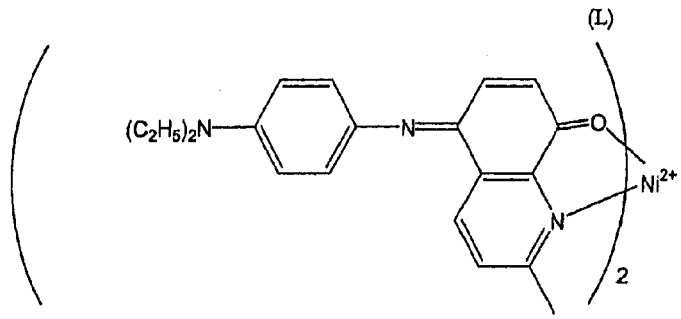

In the Claims

Col. 22 (line 22), after "materials", delete "selected from".

Col. 22 (line 23), after "ing", delete "at least one of the group consisting of".

Col. 22 (line 24), after "absorbing", delete "heat sensitive".

Col. 22 (line 47), delete "xan-".

Col. 22 (line 48), delete "thene compounds,".

Col. 22 (line 55), delete "3-methyl-2,2-spirobi(benzo-f-chrome)," and insert therefor --3-methyl-2,2'-spirobi(benzo-f-chrome),--.

UNITED STATES PATENT AND TRADEMARK OFFICE
CERTIFICATE OF CORRECTION

PATENT NO. : 7,172,991 B2
APPLICATION NO. : 09/976877
DATED : February 6, 2007
INVENTOR(S) : Anderson et al.

It is certified that error appears in the above-identified patent and that said Letters Patent is hereby corrected as shown below:

Col. 23, Formula (XX): delete the entire formula (XX) and replace it with the following formula (XX):

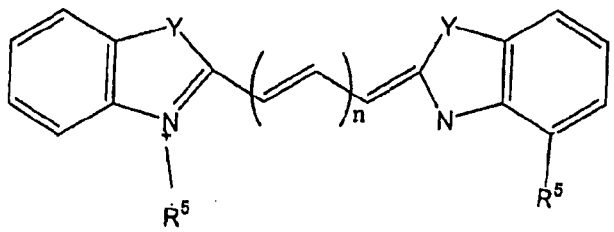

Col. 23 (line 25), delete "R5" and insert therefor --$R^5$--.

Col. 23 (line 26), delete "N-CH3, C(CH3)2," and insert therefor --N-$CH_3$, $C(CH_3)_2$,--.

Col. 29, Structure (L): delete the entire structure (L) and replace it with the following structure (L):

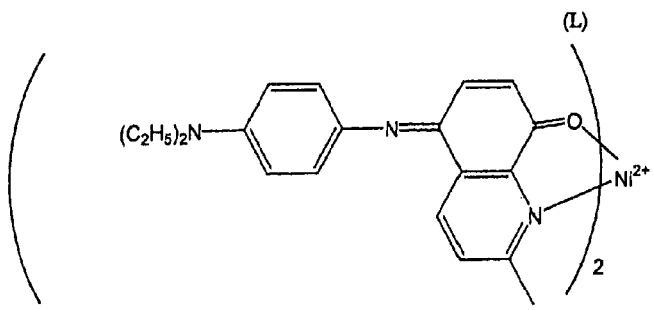

Col. 29 (line 53), delete "R1R2N-substituent" and insert therefor --$R^1R^2$N-substituent--.

Col. 29 (line 55), delete "R1 and R2" and insert therefor --$R^1$ and $R^2$--.

Col. 30 (line 49), delete "R1 and R2" and insert therefor --$R^1$ and $R^2$--.

Col. 32 (line 19), delete "X, X1, $X^2$ and R1" and insert therefor --X, $X^1$, $X^2$ and $R^1$--.

Col. 32 (line 20), delete "R6" and insert therefor --$R^6$--.

UNITED STATES PATENT AND TRADEMARK OFFICE
CERTIFICATE OF CORRECTION

PATENT NO.       : 7,172,991 B2
APPLICATION NO.  : 09/976877
DATED            : February 6, 2007
INVENTOR(S)      : Anderson et al.

It is certified that error appears in the above-identified patent and that said Letters Patent is hereby corrected as shown below:

Col. 32 (line 20), delete "C):" and insert therefor --c):--.

Col. 32 (line 21), delete "R4" and insert therefor --$R^4$--.

Col. 32 (line 26), delete "R4" and insert therefor --$R^4$--.

Col. 32 (line 27), delete "R7 and R8" and insert therefor --$R^7$ and $R^8$--.

Col. 32 (line 28), delete "R7" and insert therefor --$R^7$--.

Col. 32 (line 29), delete "R8" and insert therefor --$R^8$--.

Col. 32 (line 31), delete "$C_2$H4- bond," and insert therefor --$C_2H_4$- bond,--.

Col. 33 (line 19), delete "X, $X_1$, $X_2$ and $R_1$" and insert therefor --X, $X^1$, $X^2$ and $R^1$--.

Col. 33 (line 20), delete "$R_6$" and insert therefor --$R^6$--.

Col. 33 (line 22), delete "$OH_3$;" and insert therefor --$CH_3$;--.

Col. 33 (line 32), delete "R2, R4," and insert therefor --$R^2$, $R^4$,--.

Col. 33, delete chemical structures III and IV.

Col. 34 (line 16), delete "R4" and insert therefor --$R^4$--.

Col. 34 (line 18), delete "R2 and R4" and insert therefor --$R^2$ and $R^4$--.

Col. 34 (line 20), delete "feast" and insert therefor --least--.

Col. 34 (line 36), delete "comprising".

Col. 34 (line 66), delete "aryl, aryl," and insert therefor --aryl,--.

Col. 34 (line 67), delete "R4" and insert therefor --$R^4$--.

Col. 35 (line 2), delete "R13" and insert therefor --$R^{13}$--.

Col. 35 (line 3), delete "R6" and insert therefor --$R^6$--.

UNITED STATES PATENT AND TRADEMARK OFFICE
CERTIFICATE OF CORRECTION

PATENT NO. : 7,172,991 B2
APPLICATION NO. : 09/976877
DATED : February 6, 2007
INVENTOR(S) : Anderson et al.

It is certified that error appears in the above-identified patent and that said Letters Patent is hereby corrected as shown below:

Col. 35 (line 4), delete "R9" and insert therefor --$R^9$--.

Col. 35 (line 4), delete "R10 through R13" and insert therefor --$R^{10}$ through $R^{13}$--.

Col. 35 (line 4), at the end of the line delete "R10" and insert therefor --$R^{10}$--.

Col. 35 (line 5), delete "R13" and insert therefor --$R^{13}$--.

Col. 35 (line 5), delete "R1 and R2" and insert therefor --$R^1$ and $R^2$--.

Col. 35 (line 8), delete "CR'R'" and insert therefor --CR'R"--.

Col. 35 (line 33), delete "R8" and insert therefor --$R^8$--.

Col. 35 (line 64), delete "R1 through R6" and insert therefor --$R^1$ through $R^6$--.

Col. 35 (line 66), delete "N-R7, wherein R7" and insert therefor --N-$R^7$, wherein $R^7$--.

Col. 36 (line 1), delete "R1 and R2" and insert therefor --$R^1$ and $R^2$--.

Col. 36 (line 3), delete "N-R7, wherein R7" and insert therefor --N-$R^7$, wherein $R^7$--.

Col. 36 (line 4), delete "R3 and R4" and insert therefor --of $R^3$ and $R^4$--.

Col. 36, Structures (XII), (XIII), and (XIV): delete the entire structures (XII), (XIII), and (XIV) and replace them with the following structures (XII), (XIII), and (XIV):

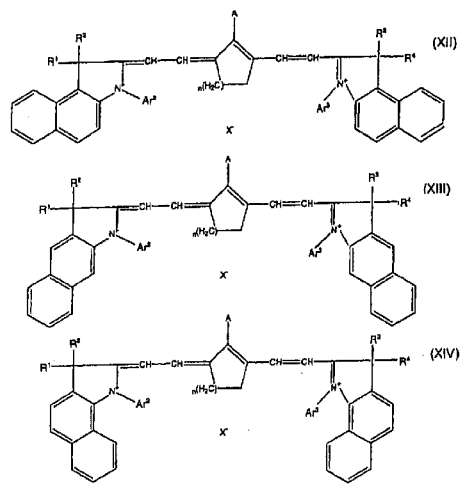

UNITED STATES PATENT AND TRADEMARK OFFICE
CERTIFICATE OF CORRECTION

PATENT NO. : 7,172,991 B2
APPLICATION NO. : 09/976877
DATED : February 6, 2007
INVENTOR(S) : Anderson et al.

It is certified that error appears in the above-identified patent and that said Letters Patent is hereby corrected as shown below:

Col. 36 (line 40), delete "R1-R4" and insert therefor --$R^1$-$R^4$--.

Col. 36 (line 42), delete "Ar2 and Ar3" and insert therefor --$Ar^2$ and $Ar^3$--.

Col. 37 (line 23), after "area", delete "is".

Col. 38, Formula (XX): delete the entire formula (XX) and replace it with the following formula (XX):

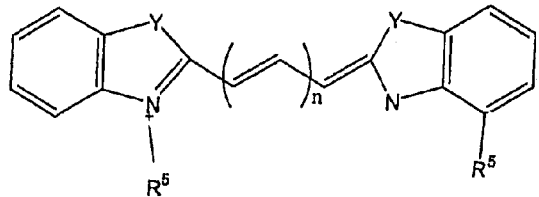

Col. 38 (line 20), delete "R5" and insert therefor --$R^5$--.

Col. 38 (line 21), delete "N-CH3, C(CH3)2," and insert therefor --N-$CH_3$, $C(CH_3)_2$,--.

Col. 38 (line 32), delete "of." and insert therefor --of:--.

Col. 38 (line 55), delete "of" and insert therefor --of:--.

Col. 40 (line 2), delete "of" and insert therefor --of:--.

Col. 40 (line 26), delete "of" and insert therefor --of:--.

Col. 45, Structure (L): delete the entire structure (L) and replace it with the following structure (L):

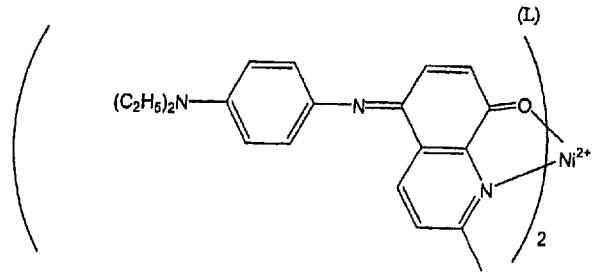

UNITED STATES PATENT AND TRADEMARK OFFICE
CERTIFICATE OF CORRECTION

PATENT NO. : 7,172,991 B2
APPLICATION NO. : 09/976877
DATED : February 6, 2007
INVENTOR(S) : Anderson et al.

It is certified that error appears in the above-identified patent and that said Letters Patent is hereby corrected as shown below:

Col. 45 (line 32), delete "R1R2N-substituent" and insert therefor --$R^1R^2N$-substituent--.

Col. 45 (line 34), delete "R1 and R2" and insert therefor --$R^1$ and $R^2$--.

Col. 45 (line 45), delete "R1 and R2" and insert therefor --$R^1$ and $R^2$--.

Col. 47 (line 39), delete "X, X1, X2 and R1" and insert therefor --X, $X^1$, $X^2$ and $R^1$--.

Col. 47 (line 40), delete "C):" and insert therefor --c):--.

Col. 47 (line 48), delete "C1-C10" and insert therefor --C1-C8--.

Col. 48 (line 34), delete "X, $X_1$, $X_2$ and $R_1$" and insert therefor --X, $X^1$, $X^2$ and $R^1$--.

Col. 48 (line 35), delete "$R_6$" and insert therefor --$R^6$--.

Col. 48 (line 37), delete "OH$_3$;" and insert therefor --CH$_3$;--.

Col. 49 (line 51), delete "R3" and insert therefor --$R^3$--.

Col. 49 (line 51), delete "aryl, aryl," and insert therefor --aryl,--.

Col. 49 (line 52), delete "R4 and R5" and insert therefor --$R^4$ and $R^5$--.

Col. 49 (line 54), delete "R6 through R13" and insert therefor --$R^6$ through $R^{13}$--.

Col. 49 (line 55), delete "R6" and insert therefor --$R^6$--.

Col. 49 (line 56), delete "R9" and insert therefor --$R^9$--.

Col. 49 (line 56), delete "R10 through R13" and insert therefor --$R^{10}$ through $R^{13}$--.

Col. 49 (line 56), at the end of the line delete "R10" and insert therefor --$R^{10}$--.

Col. 49 (line 57), delete "R13" and insert therefor --$R^{13}$--.

Col. 49 (line 57), delete "R1 and R2" and insert therefor --$R^1$ and $R^2$--.

Col. 49 (line 60), delete "CR'R'" and insert therefor --CR'R"--.

UNITED STATES PATENT AND TRADEMARK OFFICE
CERTIFICATE OF CORRECTION

PATENT NO. : 7,172,991 B2
APPLICATION NO. : 09/976877
DATED : February 6, 2007
INVENTOR(S) : Anderson et al.

It is certified that error appears in the above-identified patent and that said Letters Patent is hereby corrected as shown below:

Col. 50, before line 35, insert the following structure:

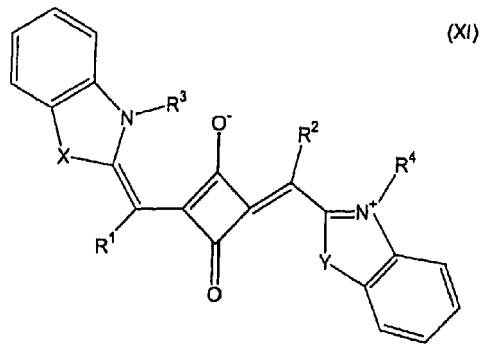

Col. 50 (line 35), delete "R1 through R6" and insert therefor --$R^1$ through $R^6$--.

Col. 50 (line 37), delete "N-R7, wherein R7" and insert therefor --N-$R^7$, wherein $R^7$--.

Col. 50 (line 39), delete "R1 and R2" and insert therefor --$R^1$ and $R^2$--.

Col. 50 (line 41), delete "N-R7, wherein R7" and insert therefor --N-$R^7$, wherein $R^7$--.

Col. 50 (line 42), delete "R3 and R4" and insert therefor --$R^3$ and $R^4$--.

Col. 50, Structures (XII) and (XIII): delete the entire structures (XII) and (XIII) and replace them with the following structures (XII) and (XIII):

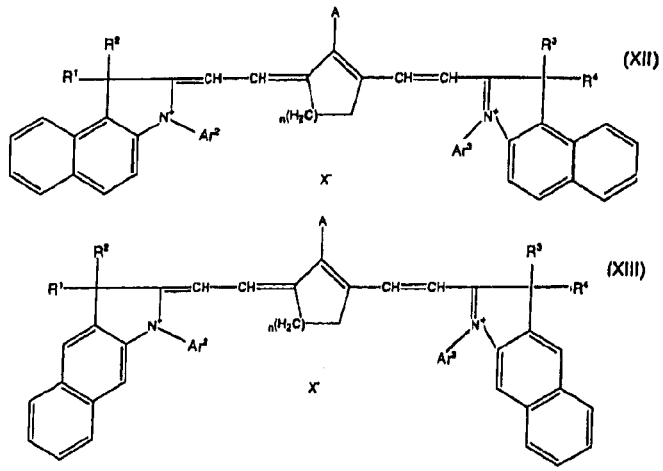

UNITED STATES PATENT AND TRADEMARK OFFICE
CERTIFICATE OF CORRECTION

PATENT NO. : 7,172,991 B2
APPLICATION NO. : 09/976877
DATED : February 6, 2007
INVENTOR(S) : Anderson et al.

It is certified that error appears in the above-identified patent and that said Letters Patent is hereby corrected as shown below:

Col. 51 (line 1), delete the entire structure (XIV) and replace it with the following structure (XIV):

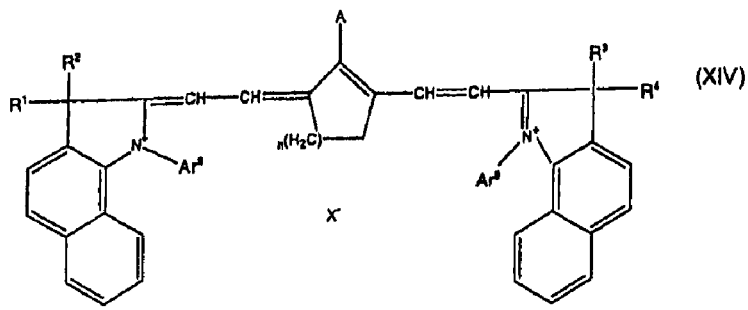

Col. 51 (line 15), delete "R1-R4" and insert therefor --$R^1$-$R^4$--.

Col. 51 (line 17), delete "Ar2 and Ar3" and insert therefor --$Ar^2$ and $Ar^3$--.

Signed and Sealed this

Sixth Day of May, 2008

JON W. DUDAS
*Director of the United States Patent and Trademark Office*